US006332030B1

(12) United States Patent
Manjunath et al.

(10) Patent No.: US 6,332,030 B1
(45) Date of Patent: Dec. 18, 2001

(54) METHOD FOR EMBEDDING AND EXTRACTING DIGITAL DATA IN IMAGES AND VIDEO

(75) Inventors: B. S. Manjunath; Jong Jin Chae; Debargha Mukherjee, all of Goleta; Sanjit K. Mitra, Santa Barbara, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/231,547

(22) Filed: Jan. 14, 1999

Related U.S. Application Data

(60) Provisional application No. 60/071,581, filed on Jan. 15, 1998.

(51) Int. Cl.$^7$ ........................................ G06K 9/00
(52) U.S. Cl. ............................. 382/100; 382/232
(58) Field of Search ................... 382/100, 248, 382/253, 232; 713/176

(56) References Cited

U.S. PATENT DOCUMENTS

| | | | |
|---|---|---|---|
| 5,150,209 | * 9/1992 | Baker et al. | 358/133 |
| 5,677,956 | * 10/1997 | Lafe | 380/28 |
| 5,867,602 | * 2/1999 | Zandi et al. | 382/248 |
| 5,915,027 | * 6/1999 | Cox et al. | 380/54 |
| 6,154,572 | * 11/2000 | Chaddha | 382/253 |

* cited by examiner

Primary Examiner—Leo Boudreau
Assistant Examiner—Abolfazl Tabatabai

(74) Attorney, Agent, or Firm—John P. O'Banion

(57) ABSTRACT

A method for digital watermarking and, in particular, for digital data hiding of significant amounts of data in images and video. The method employs a discrete wavelet transform for embedding gray scale images which can be as great as 25% of the host image data. A simple control parameter is used that can be tailored to either hiding or watermarking purposes, and is robust to operations such as JPEG compression. The method also uses noise-resilient channel codes based on multidimensional lattices which can provide for embedding signature data such as gray-scale or color images. Furthermore, embedded image data can be recovered in the absence of the original host image by inserting the data into the host image in the DCT domain by encoding the signature DCT coefficients using a lattice coding scheme before embedding, checking each block of host DCT coefficients for its texture content, and appropriately inserting the signatured codes depending on a local texture measure. The method further provides for source coding the signature data by vector quantization, where the indices are embedded in the host by perturbing it using orthogonal transform domain vector perturbations. The transform coefficients of the parent data are grouped into vectors, and the vectors are perturbed using noise-resilient channel codes derived from multidimensional lattices. The perturbations are constrained by a maximum allowable mean-squared error that can be introduced in the host. Also, speech can be hidden in video by wavelet transforming the host video frame by frame, and perturbing vectors of coefficients using lattice channel codes to represent hidden vector quantized speech. The embedded video is subjected to H.263 compression before retrieving the hidden speech.

3 Claims, 18 Drawing Sheets

| 48 | 0 | 0 | 0 | 0 | 0 | 0 | 0 |
|---|---|---|---|---|---|---|---|
| 48 | 48 | 0 | 0 | 0 | 0 | 0 | 0 |
| 300 | 48 | 48 | 0 | 0 | 0 | 0 | 0 |
| 300 | 300 | 48 | 48 | 0 | 0 | 0 | 0 |
| 300 | 300 | 300 | 48 | 48 | 0 | 0 | 0 |
| 1232 | 1232 | 300 | 300 | 300 | 48 | 48 | 0 | 0 |
| 1232 | 1232 | 1232 | 300 | 300 | 300 | 48 | 0 |
| 1232 | 1232 | 1232 | 300 | 300 | 300 | 300 | 0 |

METHOD FOR EMBEDDING AND EXTRACTING DIGITAL DATA IN IMAGES AND VIDEO

CROSS-REFERENCE TO RELATED APPLICATIONS

This application claims priority from U.S. provisional application Ser. No. 60/071,581 filed on Jan. 15, 1998.

STATEMENT REGARDING FEDERALLY SPONSORED RESEARCH OR DEVELOPMENT

This invention was made with Government support under Grant Nos. 94-1120 and 97-04785 awarded by the National Science Foundation, Grant No. NAGW 3951 awarded by the National Aeronautics and Space Administration, and Grant No. N00014-95-1-1214 awarded by the Office of Naval Research. The Government has certain rights in this invention.

REFERENCE TO A MICROFICHE APPENDIX

Not Applicable

NOTICE OF MATERIAL SUBJECT TO COPYRIGHT PROTECTION

All of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever.

BACKGROUND OF THE INVENTION

1. Field of the Invention

This invention pertains generally to encoding and decoding data, and more particularly to a method for embedding data in still images and video frames.

2. Description of the Background Art

As multimedia data becomes widespread, such as on the internet, there is a need to address issues related to the security and protection of such data, as well as to ensure copyright protection. Most multimedia data sources are readily accessible to, and downloadable by, all users of the internet. While access restriction can be provided using electronic keys, they do not offer protection against further (illegal) distribution of such data.

Digital watermarking is one approach to managing this problem by encoding user or other copyright information directly in the data. The purpose of digital watermarking is not to restrict use of multimedia resources, but to resist attack from unauthorized users.

While watermarking of image data could be visible, such as a background transparent signature, a visible watermark may not be acceptable to users in some contexts. Therefore, it is preferable to digitally watermark and image by invisibly hiding a signature information into the host image. The signature is then recovered using an appropriate decoding process.

In order to be effective, an invisible watermark should be secure, reliable, and resistant to common signal processing operations and intentional attacks. Recovering the signature from the watermarked media could be used to identify the rightful owners and the intended recipients as well as to authenticate the data. In this paper we are mainly interested in embedding data such that the signature is invisible in the host image. The challenge is to simultaneously ensure that the watermarked image be perceptually indistinguishable from the original, and that the signature be recoverable even when the watermarked image has been compressed or transformed by standard image processing operations.

Research on digital watermarking can be categorized into two broad classes depending on the data embedding domain. One such class is based on embedding data in the spatial domain, while the other is based on injection in the frequency or transform domain. Most of the recent research on watermarking emphasizes the transform domain approach. Targeted applications include watermarking for copyright protection or authentication. Typically, the data used to represent the digital watermarks are a very small fraction of the host image data. Such signatures include, for example, pseudo-random numbers, trademark symbols and binary images. Spatial domain methods usually modify the least-significant bits of the host image, and are, in general, not robust to operations such as low-pass filtering. Much work has also been done in modifying the data in the transform domain. These include DCT domain techniques and wavelet transforms.

While most of the contemporary research on watermarking concentrates on copyright protection in internet data distribution, a different kind of watermarking, commonly known as data hiding, is at present receiving considerable attention. Data hiding is a generalization of watermarking wherein perceptually invisible changes are made to the image pixels for embedding additional information in the data. Data hiding is intended to hide larger amounts of data into a host source, rather than just to check for authenticity and copyright information. In fact, the problem of watermarking or copyright protection is a special case of the generic problem of data hiding, where a small signature is embedded with greater robustness to noise.

Data hiding provides a mechanism for embedding control, descriptive, or reference information in a given signal. For example, this information can be used for tracking the use of a particular video clip, e.g., for pay-per-use applications, including billing for commercials and video and audio broadcast. Data hiding could be quite challenging if one considers embedding one image in another image.

There has also been work on data hiding in color images. Once method is to use an amplitude modulation scheme wherein signature bits are multiply embedded by modifying pixel values in the blue channel. The blue channel is chosen as the human visual system is less sensitive to blue than other primary colors. Also, changes in regions of high frequencies and high luminance are less perceptible, and thus are favorable locations for data embedding. Robustness is achieved by embedding the signature several times at many different locations in the image. Another approach is use the S-CIELAB, a well-known standard for measuring color reproduction errors. In that approach, amplitude-modulated sinusoidal signals are embedded into the yellow-blue color band of an opponent-color representation scheme.

It will also be appreciated that, in perceptual data hiding, one is interested in embedding and recovering high quality multimedia data, such as images, video and audio. The host multimedia data itself could be subject to signal processing operations, typically compression. Depending on the end user application, both lossy and lossless data embedding is of interest. Like in digital watermarking, two scenarios are possible. One is that the original host into which the data is embedded is available. Alternatively, the original host information may not available. This is a much more difficult problem.

Data hiding can also be used for transmitting different kinds of information securely over an existing channel dedicated for transmitting something else, such as transmitting hidden speech over a channel meant for transmitting H.263 video, as in this work. Since a substantial amount has already been invested in the development of the software and hardware infrastructure for standard-based data transmission, it makes monetary sense to try to use the same for transmission of secure or non-standard data.

BRIEF SUMMARY OF THE INVENTION

In general terms, the present invention pertains to a data embedding scheme that is suitable for both watermarking and image data hiding. While watermarking requires robustness to image manipulation, data hiding requires that there is very little visible distortion in the host image. While much of the previous work used signature data that is a small fraction of the host image data, the present invention can easily handle gray-scale images that could be as much as 25% of the host image.

In accordance with one aspect of the invention, in recovering the signature image, it is assumed that the original host image is available. The invention distributes the signature information in the discrete wavelet transform (DWT) domain of the host image. Spatial distribution of the DWT coefficients helps to recover the signature even when the images are compressed using JPEG lossy compression. In some of the recent work on using wavelets for digital watermarking, the signatures were encoded in all DWT bands. Such an embedding is sensitive to operations that change the high frequency content without degrading the image quality significantly. Examples include low pass filtering for image enhancement and JPEG lossy compression. In contrast, the present invention focuses on hiding the signature mostly in the low frequency DWT bands, and stable reconstruction can be obtained even when the images are transformed, quantized (as in JPEG), or otherwise modified by enhancement or low pass filtering operations.

In accordance with another aspect of the invention, it is also assumed that the host image is available. The invention provides a robust data hiding technique using channel codes derived from a finite subset of general n-dimensional lattices. In particular we use the lattice, which consists of all integer n-tuples with an even sum. As the quantity of embedded data increases, higher order shells of the lattice are included in the channel code to accommodate them. Using this approach, a gray-scale image of as much as half the size of the host image can be embedded by perturbing the host wavelet coefficients.

The embedding and extracting of the digital watermarking system are similar to the encoder and decoder of the digital communication system. Similar to the communication channel noise, the watermarked image might undergo undesirable transformations: for example, intentional manipulations to remove or degrade the quality of the watermarking: or typical signal processing operations such as compression that may affect the watermark. We use a wavelet-based compression scheme, and the JPEG compression scheme for the manipulation of the watermarked image before attempting retrieval. Our experimental results indicate that there are no visible distortions in the watermarked image, and the recovered signature is similar to the original signature even after 75% wavelet compression and 85% JPEG lossy compression.

In accordance with a further aspect of the invention, color signature images are fused in larger color images using wavelet transforms and lattice structures. We use the YUV color space for representing color. The Y component is the luminance part of the signal, and U and V represent the chrominance components. Adopting the YUV color space facilitates a simple extension from images to digital video such as those in the MPEG format. The U, V components are down-sampled by a factor of two. In this method, the host and signature images are first wavelet transformed used the discrete Haar wavelet transform. The wavelet coefficients are then encoded using channel codes derived from a finite subset of the lattice structure, which consists of all integer N-tuples with constraints. As the quantity of embedded data increases, higher order shells of the lattice structure are included in the channel code to accommodate them.

In accordance with a further aspect of the invention, a spatial domain embedding method for data hiding speech and video in compressed video is presented based on bit replacement. Spatial domain strategies are quite sensitive to transformations on the embedded signal. Compared to conventional techniques, the invention can embed significantly larger amount of signature data into the host—up to 25% of the host data, with little or no perceptual distortion.

An object of the invention is to embed a significant amount of data in images and/or video.

Another object of the invention is to provide for including quality control in data transmission (e.g., self-enhancing images), embedding control information in audio/visual bit streams, in addition to watermarking.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is described with reference to FIG. 1 through FIG. 30. It will be appreciated that the invention may vary as to configuration and methodology without departing from the basic concepts as disclosed herein.

1. Data Embedding

A watermark should be robust to typical image processing operations, including lossy compression. Compression techniques, such as JPEG, typically affect the high frequency components. This is also true with most perceptual coding techniques. For these reasons, a digital signature should be placed in perceptually salient regions in the data. For techniques based on frequency domain modifications, this implies embedding the signature in mostly low frequency components. Inserting a signature in low frequency components creates problems if one is interested in invisible watermarks. This is particularly true in data hiding applications where the data to be hidden could be a significant percentage of the original data.

To address this problem, the present invention uses a wavelet transform to embed signature information in different frequency bands. For experimental purposes we used the discrete Haar wavelet basis; however, those skilled in the art will appreciate that extending the invention to another wavelet basis is reasonably straightforward. Both the signature data, which in our case is another image, and the host image data, are decomposed using the discrete Haar wavelet transform (DHWT).

Figure 1:
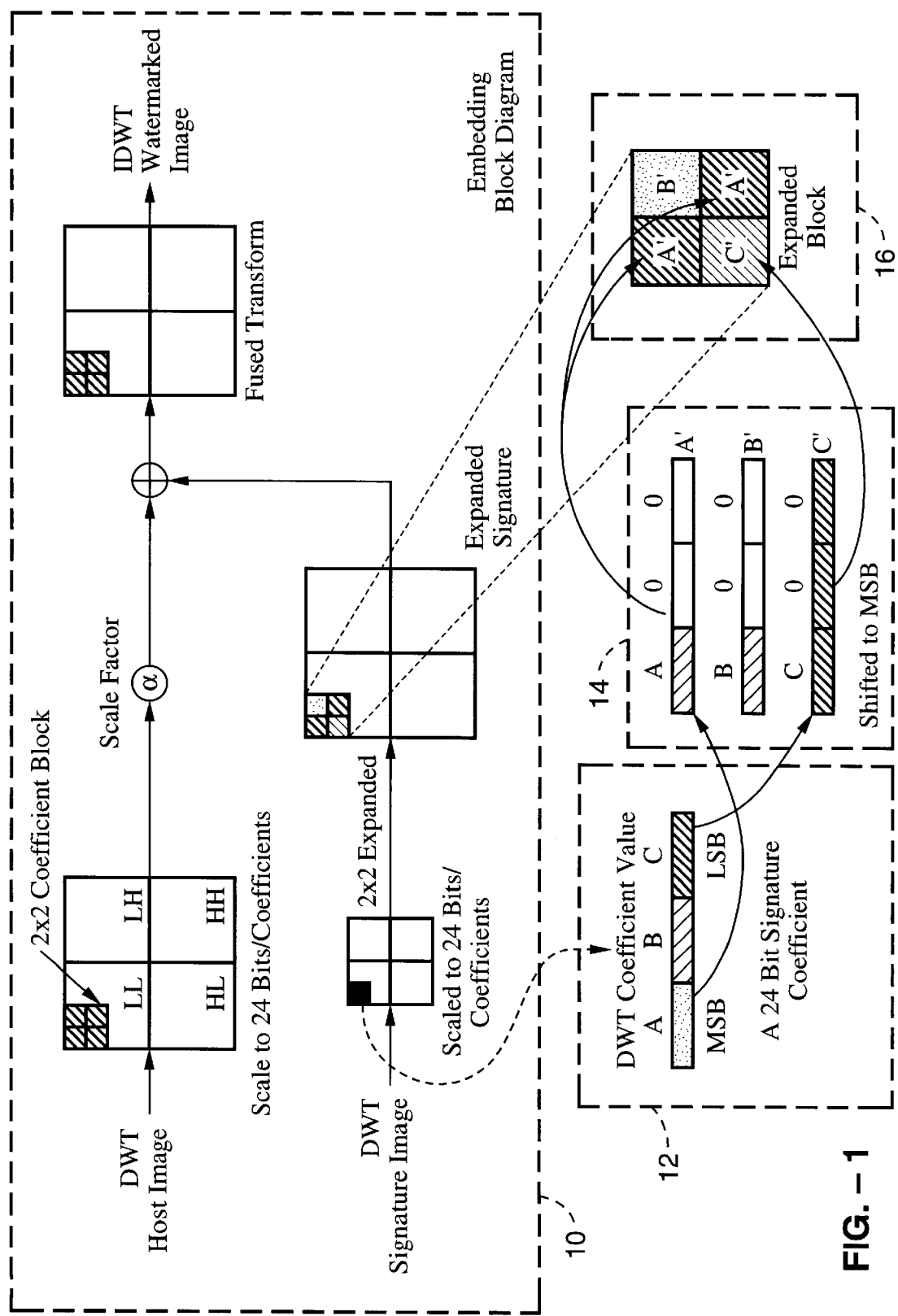
FIG. 1 is a block diagram of a method for embedding gray-scale images using a discrete wavelet transform according to the invention, where the signature image is assumed to be one quarter the size of the host image, and where there is shown an expansion of a single signature coefficient to a 2×2 block of coefficients for embedding in the host image.

In the following discussion it is assumed that the signature image is one quarter the size of the host image, and both images are gray scale, one byte per pixel. Embedding occurs in the wavelet transform domain as the wavelet coefficients are combined to create a watermarked image. It is assumed that the host image is available for signature image recovery. A schematic of this approach is shown in FIG. 1.

The basic steps in embedding the signature coefficients into the host image coefficients are:

1. Decompose by one level the host and signature images using the DHWT. This results in four bands, which are usually referred to as the LL, LH, HL, and the HH bands as shown in block 10.

2. Each signature image coefficient is expanded into a 2×2 block as follows:

(a) Each coefficient value is linearly scaled to a 24 bit representation as shown in block 12.

(b) Let A, B, C represent, respectively, the most significant byte, the middle byte, and the least significant byte in a 24 bit representation. Three 24-bit numbers, A', B', C', are generated with their most significant bytes set to A, B, and C, respectively, and with their two least significant bytes set to zero as shown in block 14. Then a 2×2 expanded block is formed as shown in block 16.

3. The host image coefficients are also linearly scaled within each band to a 24 bit representation. The minimum and maximum values in each band will be used in the inverse transformation described below.

4. The scaled host image coefficients are now added to the expanded signature transform to form a new fused transform. Let $h(m, n)$ be the $(m, n)^{th}$ wavelet coefficient of the host image, and let $s(m, n)$ be the $(m, n)^{th}$ signature coefficient after forming the expanded blocks as described in Step 2. Note that after expansion, each of the bands in the signature wavelet transform is of the same dimension as the host image bands. The fused $(m, n)^{th}$ coefficient is then computed as:

$$w(m,n)=\alpha h(m,n)+s(m,n) \quad (1)$$

where the scale factor a determines the relative percentage of the host and signature image components in the new image.

5. The fused transform coefficients in each band are scaled back to the levels of the host image transform coefficients using the minimum and maximum coefficient values in Step 3.

6. An inverse transform is now computed to give the watermarked image.

EXAMPLE 1

We present here results of embedding 128×128 gray scale (one byte per pixel) signature images in a 256×256 Lena image. Two images, one a "hat girl" picture and a picture of a tiger, were used as signature images in the following experiments. Scale factors of $\alpha=5$, $\alpha=7$, and $\alpha=11$ were used.

We noted that the higher the scale factor, the better the quality of the embedded image (i.e., less distortion due to embedding). Even if the signature image has much texture information like a tiger picture, the embedded image cannot be visually distinguished from the original host image.

Two sets of experiments were conducted. In the first, for data hiding applications, results of signature image reconstruction from JPEG lossy compressed images for varying scale factors were determined. In the second, for watermarking applications, we determined the results of signature detection from these lossy compressed images.

For data hiding purposes it is reasonable to choose a larger scale factor in Equation (1) because we are not too concerned about degradation due to image processing operations. In hiding one image in another, it is more important to ensure that the quality of the watermarked image is as close to the original as possible, with very little visual distortion. Almost perfect reconstruction is possible when there is no further image processing of the watermarked images.

On the other hand, for copyright protection and authentication purposes it is important that the watermarked images are robust to typical image processing operations. In such cases it is reasonable to assume that the signatures consume significantly fewer bytes than the host image and as such can be spatially distributed. In our experiments we used lossy JPEG compression where the signatures are the scale images, and it is reasonable to expect that one can obtain much better results if the signatures are binary images of much lower dimensions. Lower values for the scale factor in Equation (1) should be used when it is likely that the images undergo significant distortion. We recovered signatures for JPEG compression of 93% for scale factors of $\alpha=3$ to $\alpha=11$. As expected, images embedded with larger scale factor resulted in poor reconstruction for the same compression factor.

In checking for the presence of a signature, the quality of the reconstruction of signature itself is not an issue. A binary decision for the presence or absence of a signature need to be made. We used a measure of "similarity" S to compute the cross correlation between the recovered signature $s^*(m, n)$ and the original signature $s(m, n)$ in the wavelet transform domain. This similarity is defined as:

$$S = \frac{\sum_{m,n} s^*(m, n)s(m, n)}{\sum_{m,n} (s^*(m, n))^2} \quad (2)$$

Figure 2:
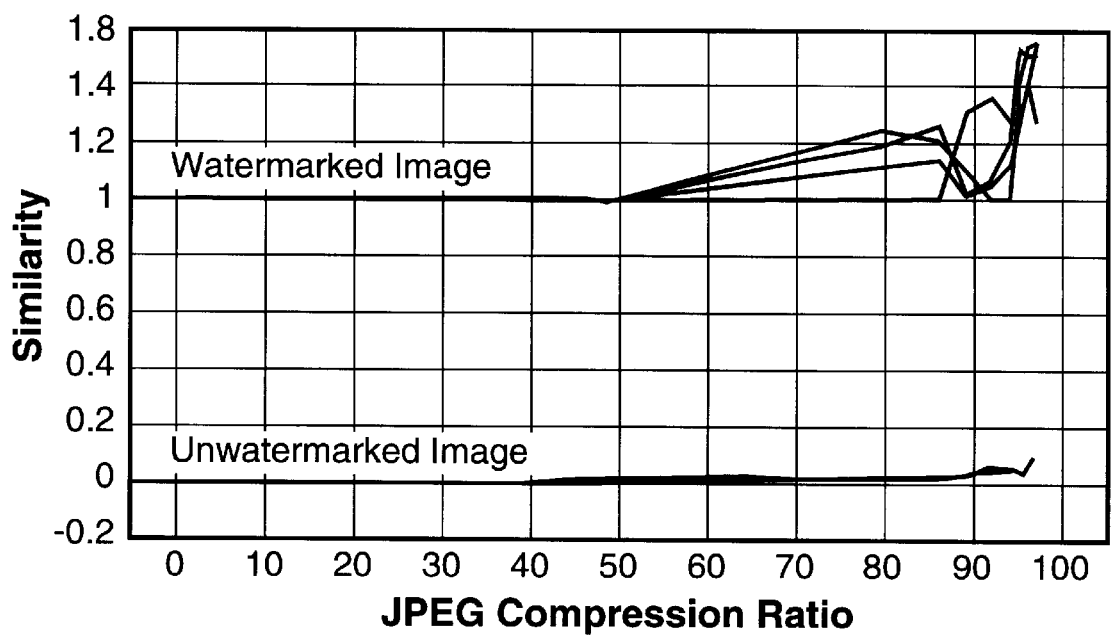
FIG. 2 is a graph showing the presence of a signature in a lossy compressed image where the host is a Lena image and the signature is a tiger image.
Figure 3:
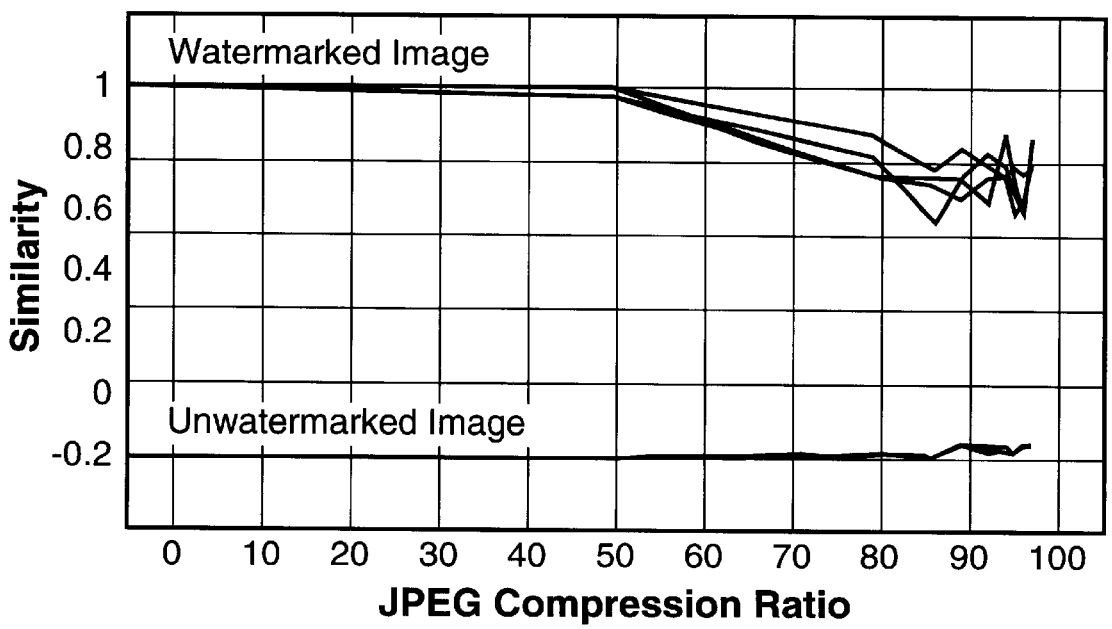
FIG. 3 is a graph showing the presence of a signature in a lossy compressed image where the host is a cityscape image and the signature is an airplane image.

Note that the similarity computed as above does not guarantee that the maximum value is 1.0. Graphs of this similarity for varying JPEG compression and for different scale factors for two different examples are shown in FIG. 2 and FIG. 3. In both graphs, the scale factors were $\alpha=5$, $\alpha=7$, $\alpha=9$ and $\alpha=11$. As can be seen from those graphs, it is easy to find a threshold for signature detection between unwatermarked and watermarked images.

The foregoing method can be used for both digital watermarking related applications as well as for data hiding purposes. The scale factor in Equation (1) controls the relative amount of host and signature image data in the embedded image. A larger scale factor can be used for data hiding where it is desirable to maintain the perceptual quality of the embedded image. A lower scale factor is better suited for watermarking where robustness to typical image processing operations is needed. Experimental results demonstrate that good quality signature recovery and authentication is possible when the images are quantized and JPEG compressed by as much as 90%.

It will be appreciated that, even though the Haar wavelet basis was used in the experiments, the method can be easily adapted to other wavelet transforms and for more than one level of decomposition. It might be worth exploring the use of other basis functions depending on the characteristics of the host and signature images. In some cases, particularly when the host image background lacks texture whereas the signature image has lot of texture, one can see a noisy background in the embedded image.

In digital watermarking, the signatures are usually of much smaller dimensions (in terms of number of bytes needed) compared to the host image. Since the method described above can manage a significantly larger number of signature data, it is possible to distribute the signature spatially as well, thus making watermarking robust to operations such as image cropping.

2. Multidimensional Lattice Channel Code 2.1 Methodology

If the original host image is available, the operations of data injection and retrieval are, in fact, very similar to the channel coding and decoding operations in a typical digital communication system. Channel coding refers to the gamut of signal processing done before transmission of data over a noisy channel. In watermarking in the transform domain, the original host data is transformed, and the transformed coefficients are perturbed by a small amount in one of several possible ways in order to represent the signature data. When the watermarked image is compressed or modified by other image processing operations, noise is added to the already perturbed coefficients. The retrieval operation subtracts the received coefficients from the original ones to obtain the noisy perturbations. The true perturbations that represent the injected data are then estimated from the noisy data as best as possible.

In the present invention, we have adopted a vector-based approach to hidden data injection. We group N transform coefficients to form an N-dimensional vector, and modify it by codes that represent the data to be embedded. The motivation for using vector perturbations as opposed to scalar perturbations follows from the realization that higher dimensional constellations usually result in lower probability of error for the same rate of data injection and the same noise statistics.

Figure 5:
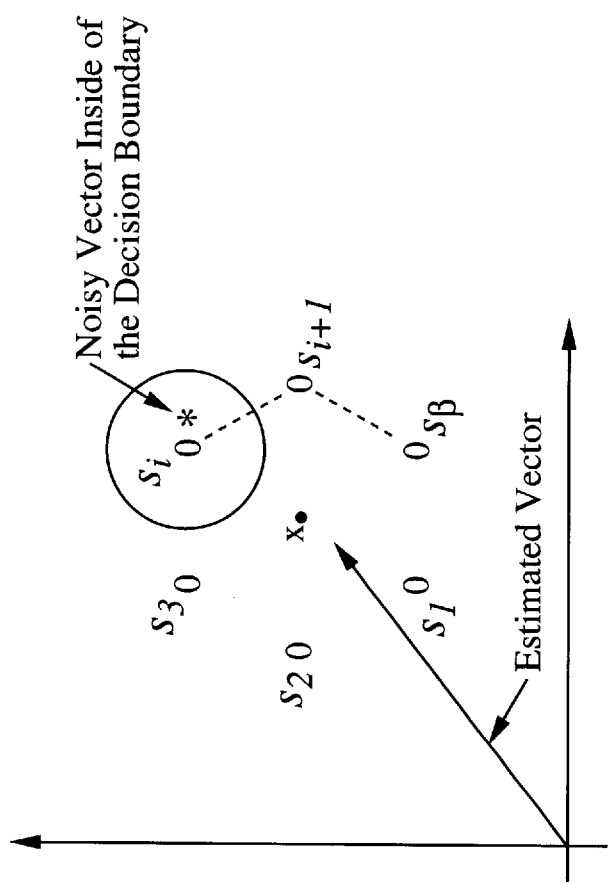
FIG. 5 is a diagram showing possible noisy vector positions of an original perturbed vector $s_i$ after transformation where all points are shown in n-dimensional space.
Figure 4:
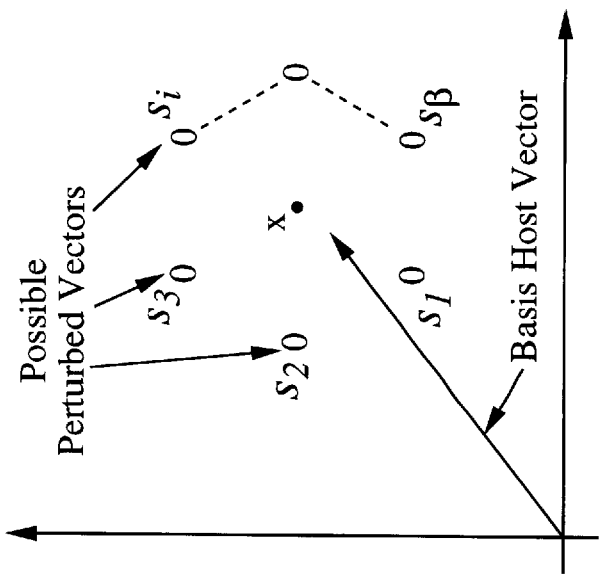
FIG. 4 is a diagram showing possible β-ary perturbations of a host vector where all points are shown in n-dimensional space.

FIG. 4 and FIG. 5 show the basic concept of the perturbation vector in the host N-dimensional vector space. In both figures, "x" represents a host vector in an N-dimensional space. To embed data from an β-ary source with symbols $\{s_1, s_2, \ldots, s_\beta\}$, we perturb the original vector so that the perturbation coincides with one of β corresponding channel codes. The perturbed vector is denoted by one of the "o"s in the figures, depending on the particular source symbol it represents. After the watermarked image has undergone compression or other transformations, a perturbed vector representing, for example symbol $s_i$ in the diagram, may be received as a noisy vector "*" in FIG. 5. It is then an estimation problem to extract the transmitted symbol from the vector received. Assuming an additive Gaussian noise model, the received vector is decoded as representing the symbol whose channel code it is closest to in Euclidean distance.

Codes derived as subsets of multidimensional lattices have been shown to be very efficient for channel coding. In the following, we describe the general concept of lattices, and in particular, the $D_4$ lattice that was used in our data embedding algorithm.

2.2 Lattice Structures

The Voronoi regions of various n-dimensional lattices can be used to construct n-dimensional quantizer cells for uniformly distributed inputs. It is known that some of these lattices produce very good channel codes, and yield high values of nominal coding gain. That is, for the same power constraint on the channel, the channel codes are maximally separated from each other so that they are most robust to noise. The lattices considered here are the root lattices and their duals, namely $A_n$, $A^*_n$, $D_n$, $D^*_n$, $E_6$, $E_8$, etc. If $a_1, \ldots, a_n$ are n linearly independent vectors in an m-dimensional Euclidean space with $m \geq n$, the set of all vectors $$x = u_1 a_1 + \ldots + u_n a_n \qquad (3)$$

where $u_1, \ldots, u_n$ are arbitrary integers, constitute an n-dimensional root lattice $\Lambda_n$. Further, if $\Lambda$ is a lattice in $\Re^n$, the dual lattice $\Lambda^*$ consists of all points x in the span of $\Lambda$ such that $x \cdot y \in z$ for all $y \in \Lambda$. Some common lattices and definitions are presented below.

For $n \geq 1$, $A_n$ is the n-dimensional lattice consisting of the points $(x_0, x_1, \ldots, x_n)$ in $Z^{n+1}$ with $\Sigma x_i = 0$.

For $n \geq 2$, $D_n$ consists of the points $(x_1, x_2, \ldots, x_n)$ in $Z^n$ with $\Sigma x_i$ even. In other words, if we color the integer lattice points alternately red and blue in a checkerboard coloring, $D_n$ consists of the red points. In 4 dimensions, the $D_4$ lattice is known to yield the best coding gain.

The $E_6$, $E_8$ and $\Lambda_{16}$ lattices give very good channel coding gains in 6, 8, and 16 dimensions respectively. The $E_8$ lattice is derived from the $D_8$ lattice, and is defined as the union of $D_8$ and the cosset $$(\tfrac{1}{2},\tfrac{1}{2},\tfrac{1}{2},\tfrac{1}{2}, \tfrac{1}{2},\tfrac{1}{2},\tfrac{1}{2},\tfrac{1}{2}) + D_8.$$

In other words, $E_8$ consists of the points $(x_1, \ldots, x_8)$ with $x_i \in Z$ and $\Sigma x_i$ even, together with the points $(y_1, \ldots, y_8)$ with $y_i \in Z + \tfrac{1}{2}$ and $\Sigma y_i$ even. $E_6$ is a subspace of dimension 6 in $E_8$, consisting of the points $(u_0, u_1, \ldots, u_n)$ with $u_6 = u_7 = -u_8$.

For a n-dimensional lattice $\Lambda$, the Voronoi region around any lattice point is the set of points in $\Re^n$ closest to the lattice point. Therefore, the Voronoi region V(0) around the origin is given as:

$$V(0) = \{x \in \Re^n \mid \|x\| \leq \|x - u\| \text{ (for all nonzero } u \in a)\} \qquad (4)$$

2.3 Description of the $D_4$ Lattice

It is known that some lattices produce very good spherical codes for channel coding. That is, for the same constraint on deviation from the true coefficient values, the channel codes are maximally separated from each other so that they are most robust to noise.

In general, the $D_4$ root lattice produces the best channel code in 4 dimensions. It is known that for small noise, this lattice gives a nominal channel coding gain of 1.414 over binary encoding. As mentioned earlier, the lattice consists of the points $(x_1, \ldots, x_4)$ having integer coordinates with an even sum.

As in all lattices, the lattice points of the $D_4$ lattice fall on concentric shells of increasing distance from the all zero vector. For example, the 24 lattice points given by all permutations of $(\pm 1, \pm 1, 0, 0)$ lie on the first shell of the lattice at a distance from the center. The second shell at distance $\sqrt{2}$ from the center contains 24 lattice points again, 8 of which are of type $(\pm 2, 0, 0, 0)$, and 16 are of type $(\pm 1, \pm 1, \pm 1, \pm 1)$. Table 1 shows the shell number, the squared norm, the lattice point types, and the number of lattice points for the first few shells of the $D_4$ lattice. The superscript "p" after the points in the table denote "all permutations of" the elements constituting it. By choosing appropriate subsets of points from the lattice the rate for data embedding can be varied.

3. Data Hiding in Images 3.1 Embedding Procedure

It is well known that embedding in the low-frequency bands is more robust to manipulations such as enhancement and image compression. However, changes made to the low frequency components may result in visible artifacts. Modifying the data in a multiresolution framework, such as a wavelet transform, will provide good quality embedding with little perceptual distortion.

Figure 6:
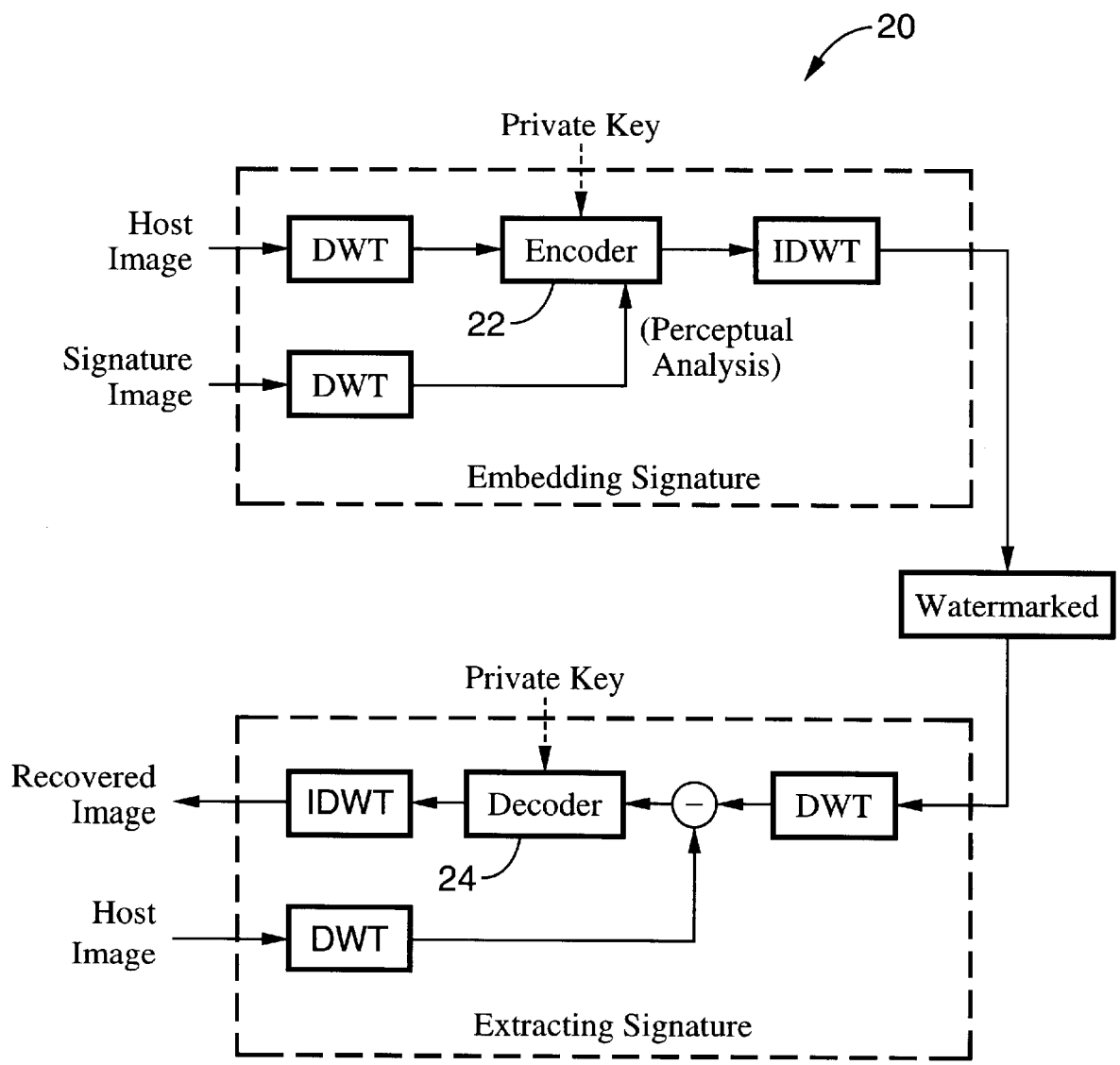
FIG. 6 is a block diagram showing a data embedding and extraction method using multidimensional lattices according to the present invention.

The schematic diagram 20 in FIG. 6 shows our watermarking procedure using multidimensional lattice channel codes. The coefficient vectors perturbed in our implementations are of dimension 4, and the channel code used to embed the data is a subset of the $D_4$ lattice. As the quantity of embedded data increases, higher order shells of the embedding lattice are included in the channel code to accommodate them. In this algorithm, a gray-scale image of as much as half the size of the host image is hidden by vector based perturbations.

Figure 7:
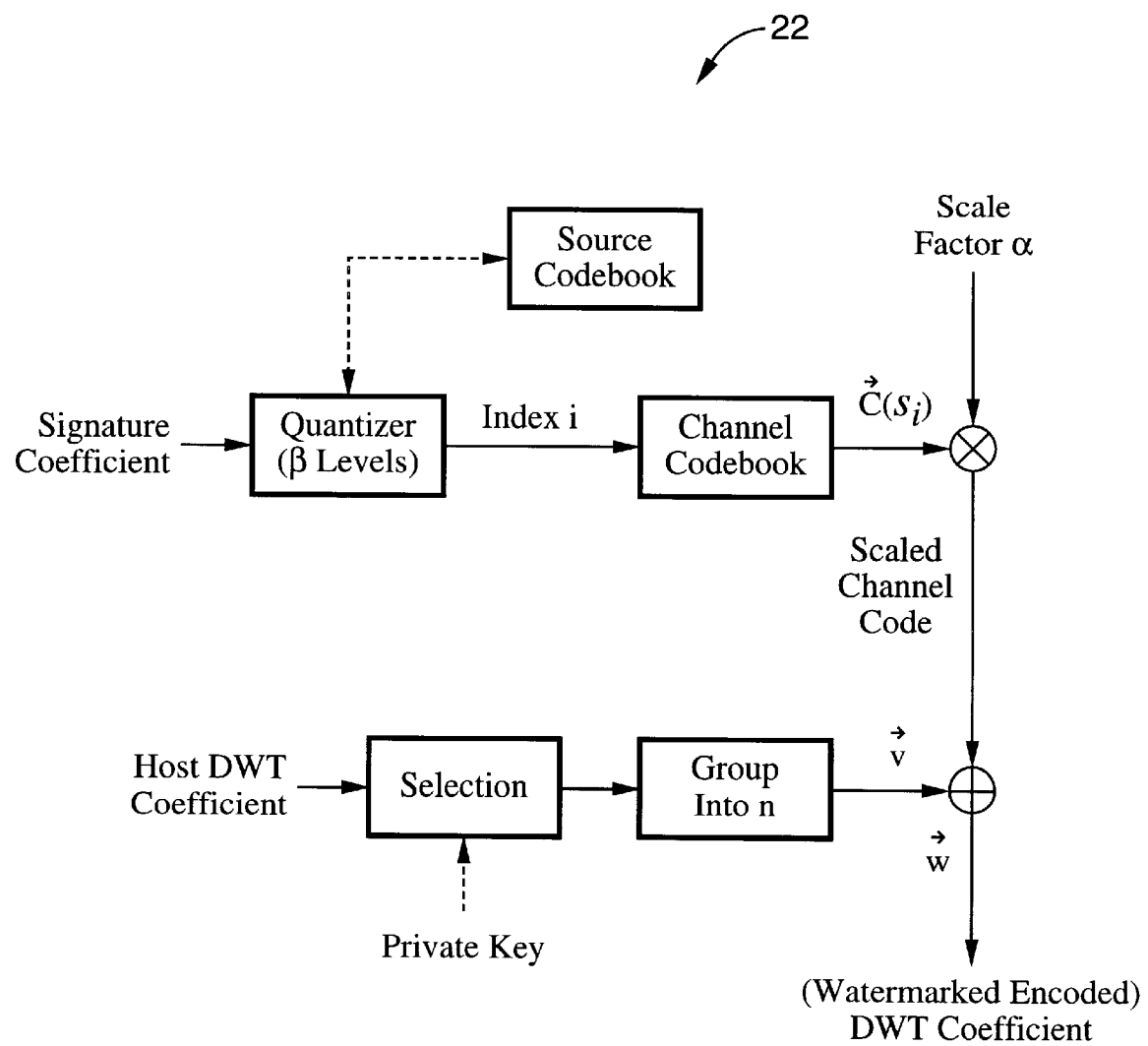
FIG. 7 is a block diagram of the encoder block shown in FIG. 6 for encoding gray scale images.

A single level of the discrete wavelet transform (DWT) decomposition of both the host and the signature image is made before data embedding. A detailed diagram of the encoder block 22 from FIG. 6 is shown in FIG. 7. Each coefficient of the signature image is quantized into β levels. In order to embed the quantized coefficient information, a set of n coefficients (n=4 in the case of $D_4$ lattice embedding) in the host image is grouped to form an n-dimensional vector, and the vector is then perturbed according to a β-ary channel code consisting of a subset of an n-dimensional lattice scaled by a factor α. If v represents a vector of host DWT coefficients after grouping, and the index of the quantized signature coefficient is i, then the perturbed vector is given by:

$$\vec{w} = \vec{v} + \alpha \cdot \vec{C}(s_i) \qquad (5)$$

where $\vec{C}(s_i)$ represents the channel code (subset of the n-dimensional lattice) corresponding to the symbol $s_i$, where $i=1, \ldots, \beta$.

Each subband of the signature image is embedded into the corresponding subband of the host. That is, each coefficient in the LL band of the signature image is hidden in four coefficients in the LL band of the host, and so on. The scale factor chosen for embedding in the higher bands is less than the scale factor chosen for the LL band, by some constant factors. However, we will refer to the scale factor chosen for the LL band as $\alpha$.

Various subsets of the 4-dimensional $D_4$ lattice chosen for various values of source quantization levels $\beta$, that were used in the experiments, are shown in Table 2. A high value of $\beta$ quantizes the signature finely, but $\alpha$ must now be higher too so that the probability of error is sufficiently low. This in turn degrades the transparency of the watermarked image. The choice of the parameters $\alpha$ and $\beta$ determines the trade-off between the transparency and the quality of the hidden data.

For security in copyright protection, we can select special regions in the transform domain to embed data, or randomly group the coefficients to form a vector using a private key. Noise-like pseudo-random sequences can be used for random grouping. It is to be noted, however, that in general, the less the quantity of data hidden, the more secure it can be made.

3.2 Extracting Data 3.2.1 Determining the Closest Point

Figure 8:
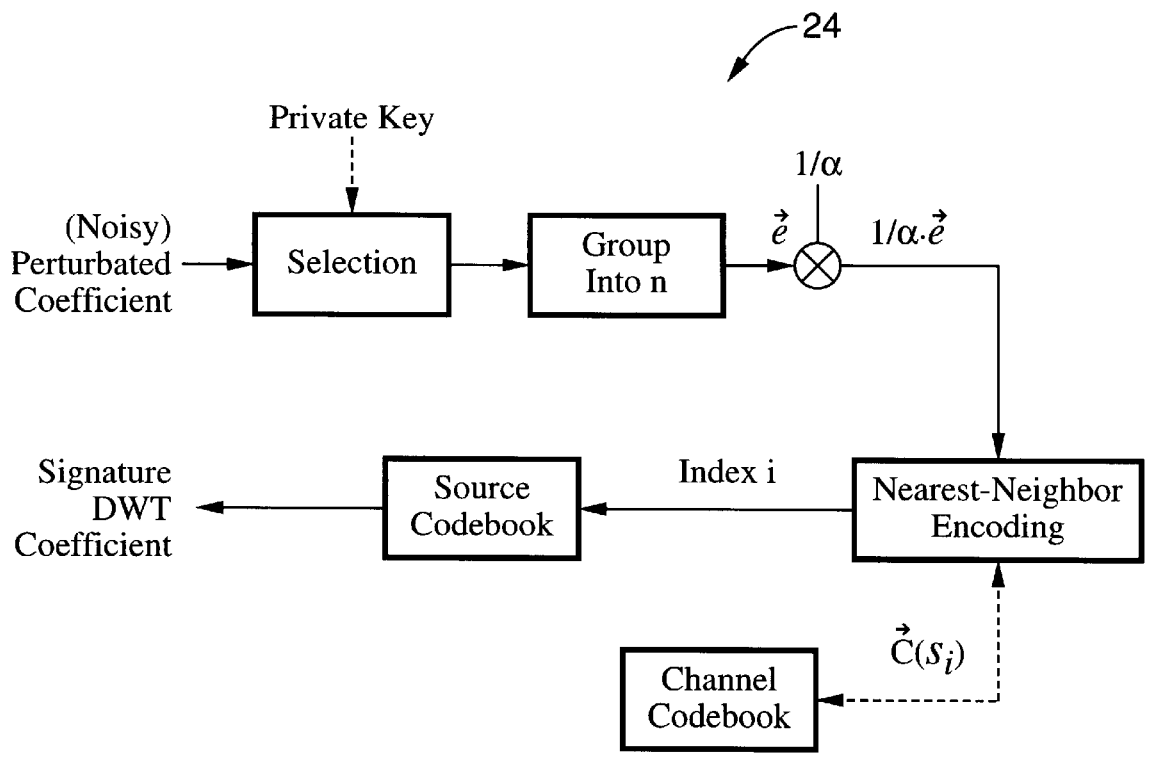
FIG. 8 is a block diagram of the decoder block shown in FIG. 6.

A watermarked image may be subject to lossy compression or other simple image processing operations such as enhancement. Under the assumption that the resulting perturbations in the wavelet transform domain can be modeled by additive Gaussian noise, a nearest-neighbor search with the Euclidean distance measure is needed to recover the embedded symbols. FIG. 8 provides a diagram of the decoder block 24 from FIG. 6 to show the details of symbol recovery and signature extraction.

Recovering the hidden data starts with the same DWT of the received watermarked image that was used to embed the data. The true host image coefficients (known to the retriever) are then subtracted from the coefficients of the received image to obtain the noisy perturbations. Note that these perturbations recovered can be "noisy", because of various possible transformations of the watermarked data.

These coefficients are now grouped into groups of n in the same manner as they were grouped during encoding (possibly using the private key) to obtain a vector $\vec{e}$, and then scaled by the factor $1/\alpha$. The resulting vector $1/\alpha \cdot \vec{e}$ is then nearest-neighbor encoded to find the index i of the channel code nearest to it in Euclidean distance. In particular, we find an index i such that:

$$\|\vec{C}(s_i) - 1/\alpha\,\vec{e}\| \leq \|\vec{C}(s_j) - 1/\alpha\,\vec{e}\|, \forall j \in \{1,2,\ldots \beta\} \quad (6)$$

where the $\vec{C}(s_i)$'s refer to the $\beta$ code-vectors in the channel codebook. For lattice based channel codes, this is equivalent to finding the lattice point in whose Voronoi region the vector $1/\alpha \cdot \vec{e}$ lies. From the index i, the quantized DWT coefficient can be obtained.

Figure 9:
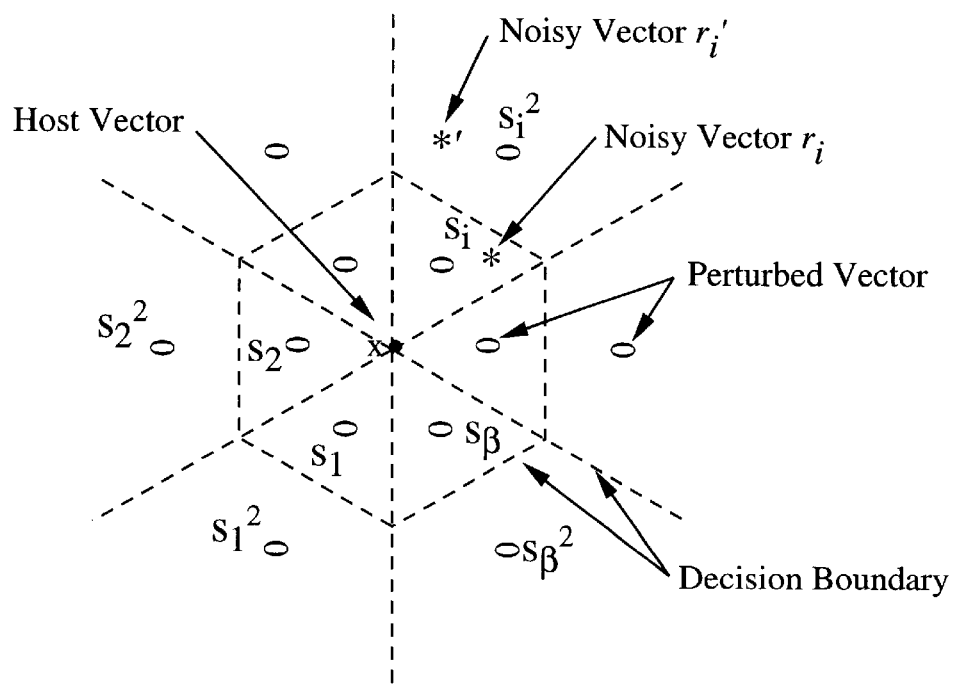
FIG. 9 is a diagram showing the decision boundary within each of a plurality of shell perturbed lattice points.

To present an example, by means of the diagram in FIG. 9, let us say that a perturbed vector corresponding to a channel code $s_i$ was received as a noisy vector $r_i$ "*". As long as it is inside the decision boundary of the original perturbed vector $s_i$, we can receive the data perfectly. However, after the general image compression schemes, for example, wavelet-based compression or JPEG coding, or other transformations like enhancement, if the embedded vector is strongly manipulated, to say, noisy vector $r'_i$ "*", located outside of the decision boundary, the symbol detected will not be the original perturbed value $s_i$. To reduce the incidence of erroneous detection, the algorithm can expand the decision boundary by using a larger scale factor.

Although the recovered signature image is limited in quality by the quantization before embedding, the similarity measure S defined in Equation (2) can be used to distinguish between watermarked and unwatermarked images. Here s(m, n) stands for the quantized signature coefficients, and s*(m, n) stands for the recovered signature coefficients after lossy compression.

3.2.2 Fast Algorithm

One of the motivations for using lattice based channel codes in our implementations is the existence of fast encoding and decoding algorithms. We present a fast encoding algorithm for the $D_n$ lattice that is used to extract the hidden symbols from the noisy vectors received, if the number of channel symbols $\beta$ is sufficiently large.

The algorithm for finding the closest point of the lattice to an arbitrary scaled noisy perturbation received $x = (1/\alpha)\vec{e} \in \Re^n$, is particularly simple. Note that all points of $D_n$ are included in the n-dimensional cubic integer lattice $I^n$. For a real scalar number $x \in \Re^n$, let $f(x)=$closest integer to x. We define $f(x)$ and the function $w(x)$ which assigns the wrong direction as follows:

If $x=0$, then $f(x)=0$, else $w(x)=1$

If $0 < m \leq x \leq m+\frac{1}{2}$, then $f(x)=m$, else $w(x)=m+1$,

If $0 < m+\frac{1}{2} < x < m+1$, then $f(x)=m+1$, else $w(x)=m$,

If $-m-\frac{1}{2} \leq x \leq -m < 0$, then $f(x)=-m$, else $w(x)=-m-1$,

If $-m-1 \leq x \leq -m-\frac{1}{2}$, then $f(x)=-m-1$, else $w(x)=-m$.

We can also write $x=f(x)+\delta(x)$, so that $|\delta(x)| \leq \frac{1}{2}$ is the distance from x to the nearest integer. Then, if $x = \{x_1, x_2, \ldots, x_n\}$, vector $f(x)$ is defined by $$f(x) = \{f(x_1), f(x_2), \ldots, f(x_k), \ldots, f(x_n)\} \quad (7)$$

and $g(x)$ is defined by $$g(x) = \{f(x_1), f(x_2), \ldots, w(x_k), \ldots, f(x_n)\} \quad (8)$$

where k is the component with the largest error distance. The nearest point to x in the $D_n$ lattice structure is chosen as whichever of $f(x)$ and $g(x)$ has an even sum of components. If x is equidistant from two or more points of the lattice, we choose the nearest point as the one having the smallest norm.

EXAMPLE 2

We used a 256×256 gray scale Lena image as the host, and two signature images, a hat-girl image and a tiger image, both of which were 128×128 gray scale. A 1-stage discrete Haar wavelet transform was used for both the encoder and the decoder.

We examined the Lena image digitally watermarked with the hat-girl image, at various scale factors $\alpha$, and various quantization levels $\beta$, without any compression. Note that the scale factor a controls the relative weight of host and signature image contributions to the fused image. As $\alpha$ increases, the quality of the watermarked image degrades. For example, we could see artifacts in the background for $\alpha=20$. We found that $\alpha=10$ appears to be a reasonable value in terms of the trade-off between quality of the watermarked image and robustness to signature recovery under image compression.

We also examined the signature images recovered from the watermarked image after 0%, 65%, 75% and 85% JPEG compression. In general, most of the recovered signature images were of very high quality for 85% JPEG compression, when the scale factor α is in the range 10–15. The quality of the recovered signature with a large scale factor α is obviously much better than those with a smaller α. The number of quantizer levels β, on the other hand, determines the coarseness of quantization and therefore the quality of the signature image hidden in the host.

Figure 10:
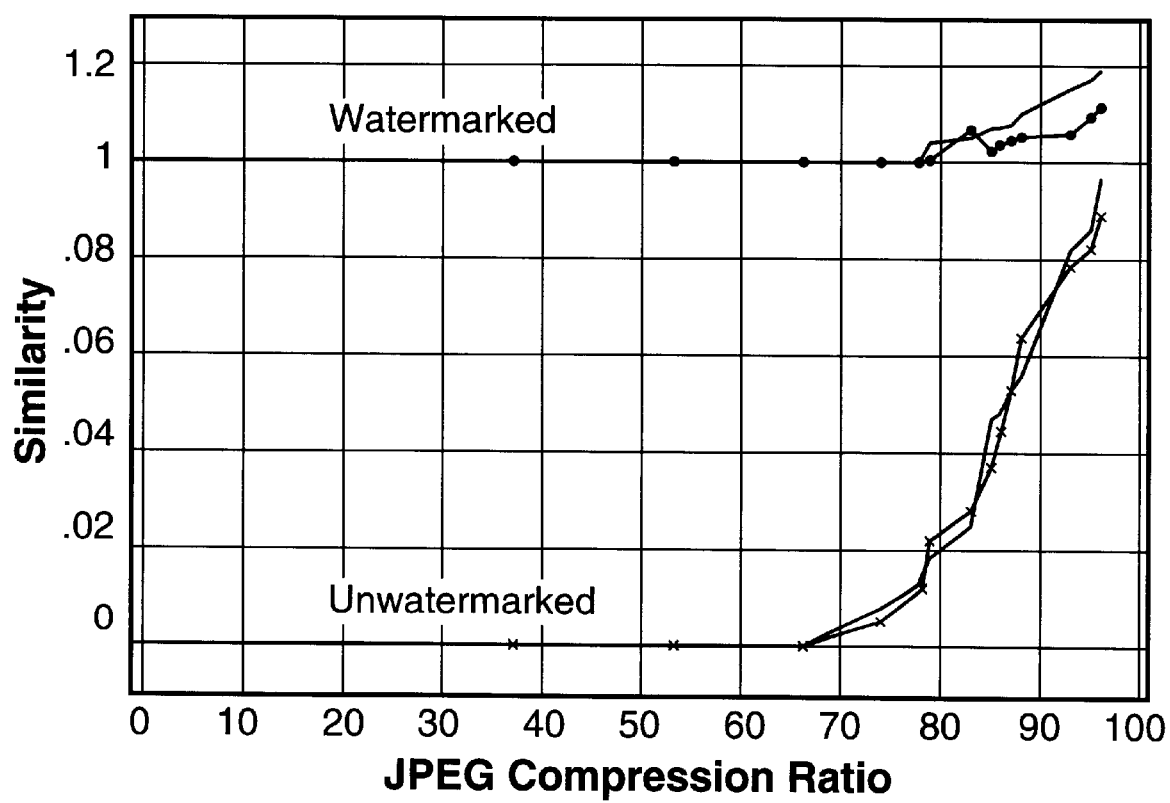
FIG. 10 is a graph showing the presence of a hat-girl signature in JPEG lossy compressed images for α=10, β=32; α=15, β=32; α=10, β=144; and α=15, β=144.

FIG. 10 shows the similarity between the original and the recovered signature, when the hat-girl image is embedded into the Lena image. Note that good authentication is possible for up to 85% JPEG lossy compression.

As can be seen from the foregoing, the invention provides for highly effective data embedding using the $D_4$ lattice in the DWT domain. The method presented provides a framework for a more structured digital watermarking scheme, aimed at embedding large amounts of data into a host. The quality of the recovered signature under significant image transformations can be improved by using higher dimensional lattice structures like the $E_8$ or the $\Lambda_{16}$ lattice. Further, by proper indexing of the scalar codebook used for the wavelet coefficients of the signature image, the recovered signature quality can be substantially improved for the same scale factor of embedding and for the same number of levels for quantization. More sophisticated schemes for error resilience, such as trellis-coded modulation, can also be used.

4. Color Image Embedding Using Multidimensional Lattice Structures

It is known that the human visual system is not very sensitive to changes in the higher frequency spectrum, and as such many of the lossy compression techniques rely on saving bits needed to represent the information in these higher frequencies. For this reason it is important that the signature data be embedded in the lower frequency components of the host data.

Figure 11:
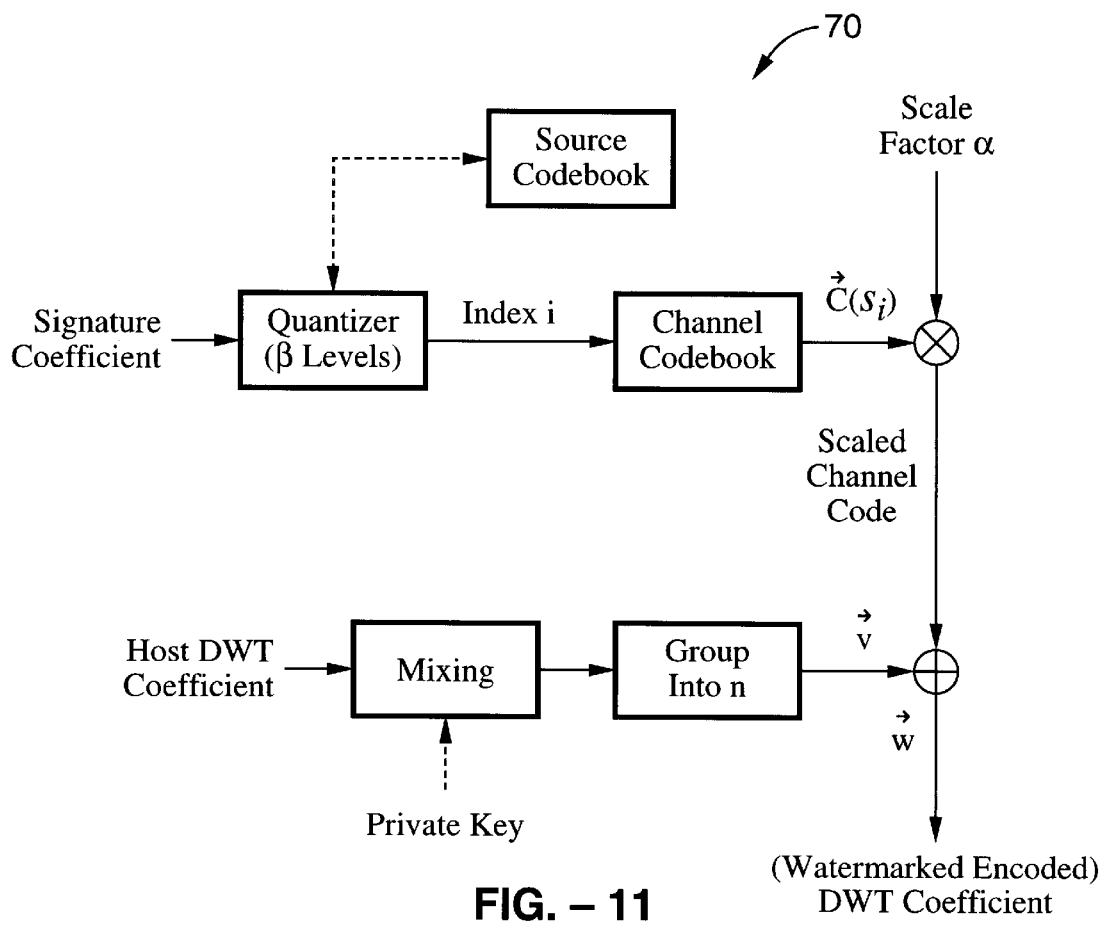
FIG. 11 is a block diagram of an alternative embodiment of the encoder shown in FIG. 7 for embedding color images.

The schematic 30 in FIG. 11 shows our color image embedding procedure. The basic hiding/extracting scheme is similar to the our previous data hiding/extracting technique using the multidimensional lattice structures described above and shown in FIG. 7. A single level of discrete wavelet transformation (DWT) of both the host and the signature image is made before data embedding. Each coefficient of the signature image is quantized into β levels. In order to embed the quantized coefficient information, a set of N coefficients in the host image is grouped to form an N-dimensional vector, and the vector is then perturbed according to a β-ary channel code consisting of a subset of the lattice scaled by a factor α. If $\vec{v}$ represents a vector of host DWT coefficients after grouping, and the index of the quantized signature coefficient is i, then the perturbed vector is given by Equation (5).

In signature recovery, the watermarked DWT coefficients are grouped based on the β-ary channel code used in encoding to obtain a new vector $\vec{e}$. This is then scaled by the factor 1/α where is as defined in Equation (5). The resultant vector is then nearest-neighbor encoded to find the index i of the channel code nearest to it in the Euclidean distance. In particular, we find an index i such that Equation (6) holds true.

Figure 12:
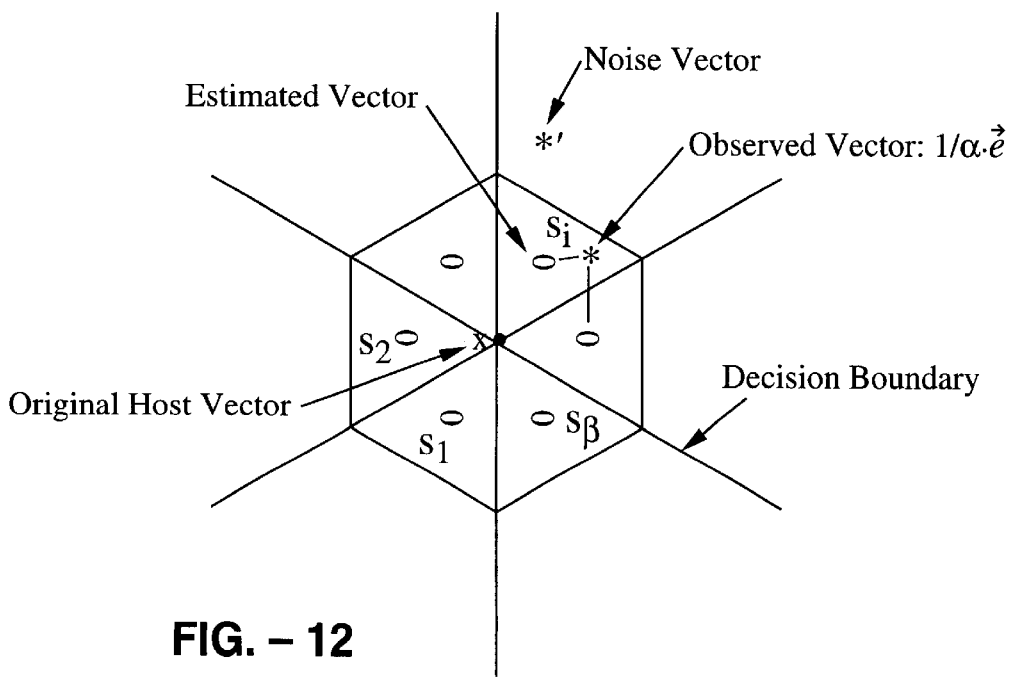
FIG. 12 is a diagram showing determination of the closest vector from the observed vector within each of a plurality of shell perturbed lattice points.

Similar to before, this is illustrated in FIG. 12. Assume that the symbol $s_i$ was sent but because of compression or some other image processing operation, the observed vector "*" (equal to $1/\alpha \cdot \vec{e}$) is obtained. If "*" is within the triangular decision boundary shown, $s_i$ will be correctly estimated. Obviously the scale factor α controls the extent of the regions around each $s_i$. A large scale factor can tolerate a large perturbation at the expense of a degradation in the watermarked image quality.

The principal difference for data hiding in color images is that color signature images are fused in larger color images using wavelet transforms and lattice structures. We use the YUV color space for representing color. The Y component is the luminance part of the signal, and U and V represent the chrominance components. Adopting the YUV color space facilitates a simple extension from images to digital video such as those in the MPEG format. The U, V components are down-sampled by a factor of two. In this method, the host and signature images are first wavelet transformed used the discrete Haar wavelet transform. The wavelet coefficients are then encoded using channel codes derived from a finite subset of the lattice structure, which consists of all integer N-tuples with constraints. As the quantity of embedded data increases, higher order shells of the lattice structure are included in the channel code to accommodate them.

EXAMPLE 3

Color images were represented in the YUV color space. We used a 256×256 color hose image and a 128×128 gray scale signature image. The signature was injected into the Y component of the transform coefficients of the host image. From observing an 81% JPEG compressed watermarked image using 32 channel codes and the same compressed image using 144 channel codes, we found that there were no visible distortions in the watermarked images. Additionally, from observing the recovered signatures for the two quantization levels, we found the reconstructed images to be of very good quality for authentication purposes.

We also examined an example of a color signature embedding. The entire signature data was embedded in the Y component of the host data in order not to distort the color in the watermarked image. For this reason, the size of the signature image was less than that for a gray scale embedding. We found our image embedding method to be robust, and concluded that it could be easily extended to video watermarking as well.

Figure 13:
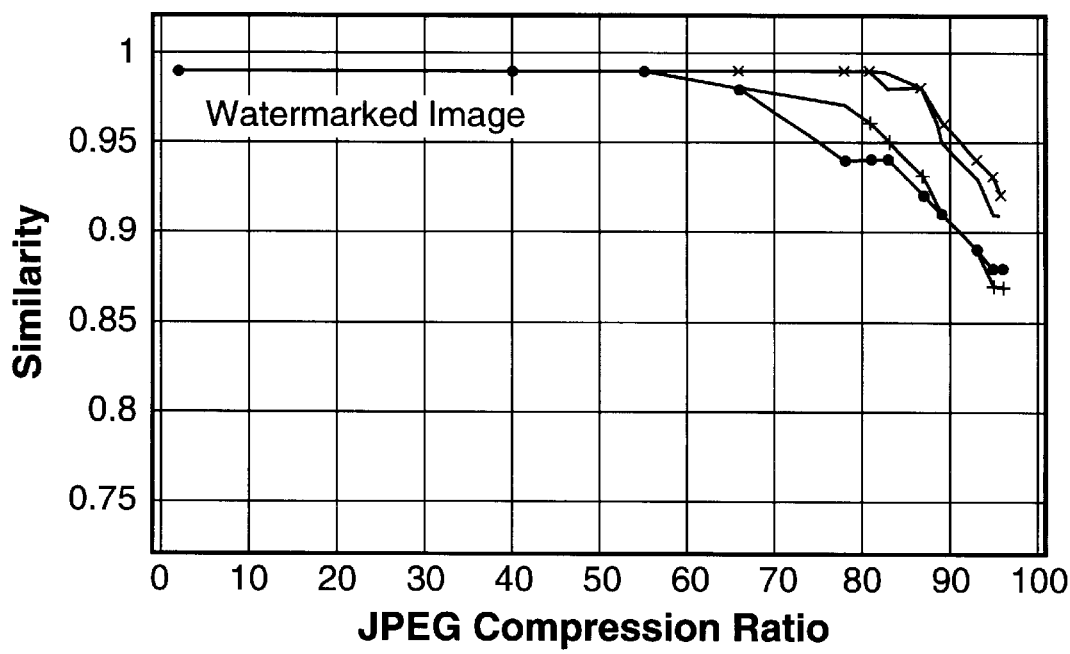
FIG. 13 is a graph showing similarity results for color data embedding.
Figure 14:
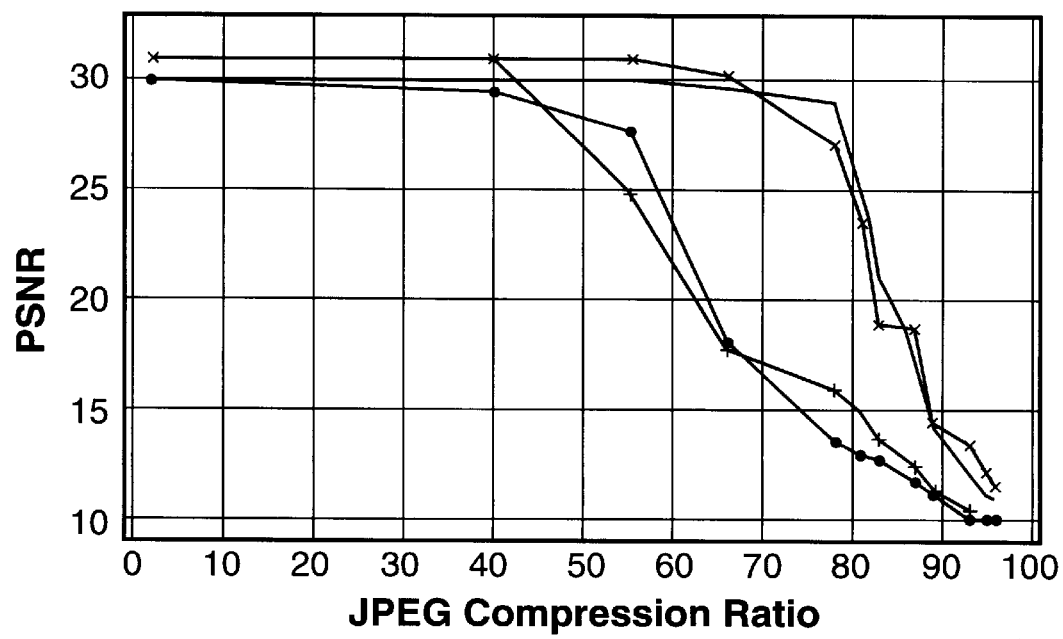
FIG. 14 is a graph showing PSNR results for color data embedding.

FIG. 13 and FIG. 14 show the similarity of the reconstructed image to the original signature image for various levels of JPEG compression. A normalized similarity function S(s) is defined as $$S(s) = \frac{\hat{s}^t s}{(\hat{s}^t \hat{s})(\hat{s}\hat{s})} \quad (9)$$

where s is the signature image components organized as a vector, and S is the reconstructed signature vector. As can be seen from the graphs, the watermarked image can be easily authenticated even at 85% lossy JPEG compression. FIG. 14 shows Peak Signal to Noise Ratio (PSNR) of the reconstructed image as a function of JPEG compression factor. The PSNR is computed with respect to the original signature before quantization. We noted that good quality reconstruction was possible up to about 75% JPEG compression for α=15.

5. Image Hiding and Reconstruction without Host Image

Figure 15:
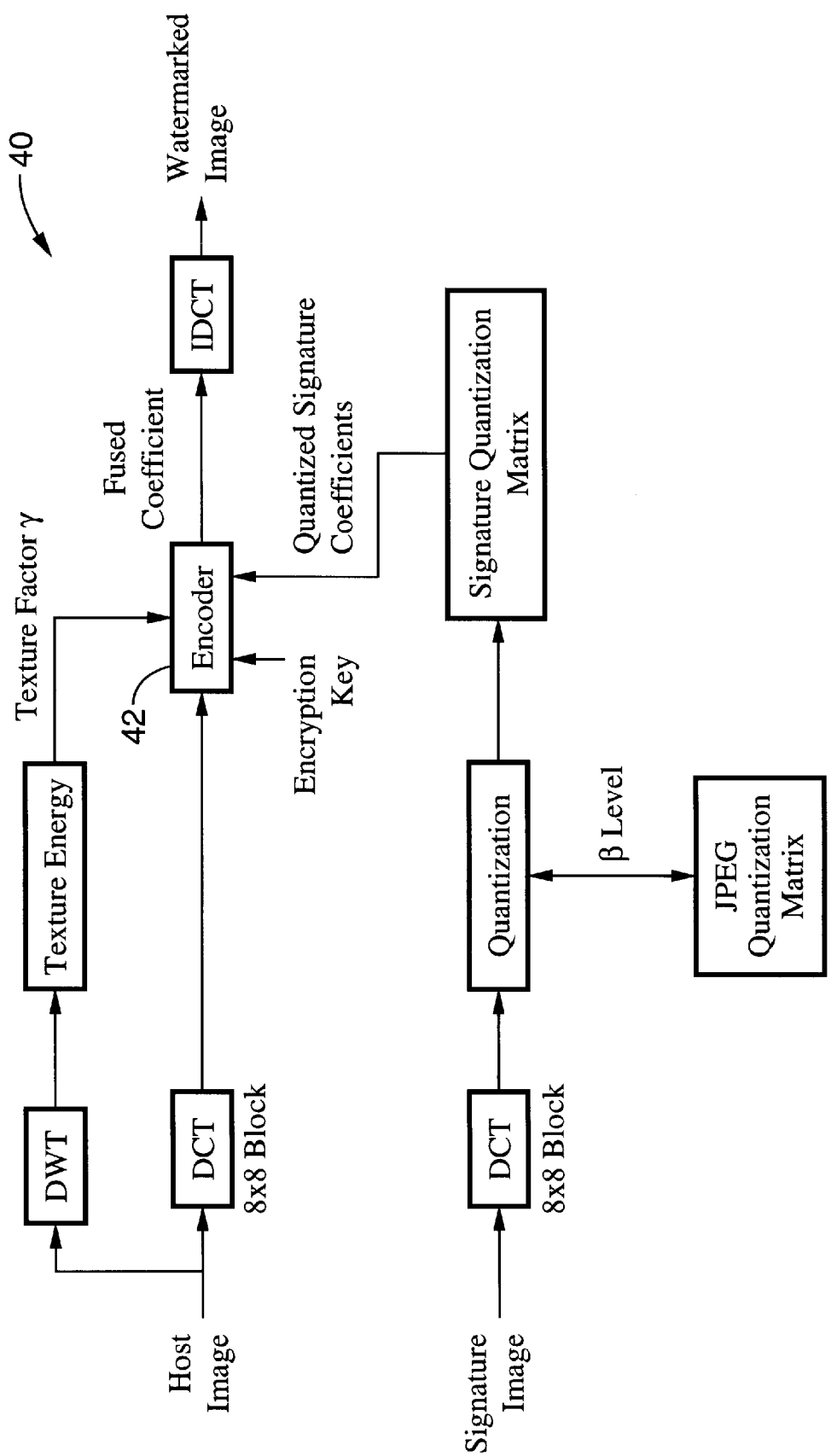
FIG. 15 is a block diagram of a method for data embedding for reconstruction without the host image according to the present invention where data is embedded in the block DCT domain, signature DCT coefficients are quantized, coded using lattice codes, and adaptively embedded into the host DCT coefficients using texture masking.

Thus far, we have discussed image reconstruction where the host image is available. However, when the host image is unavailable, additional complexities are involved. A schematic 40 our data embedding method for reconstruction without the host image is shown in FIG. 15. A key component of this method is embedding using multidimensional lattices as previously described. Signature and host images are transformed using the block Discrete Cosine Transform (DCT). The block size chosen is 8×8 pixels. The signature coefficients are quantized in two steps. First, by using the standard JPEG quantization matrix, and then by a user specified signature quantization matrix. The signature quantization matrix determines the relative size of signature data compare to the host data, thus controlling the quantity and quality of the embedded data as described in Section 5.1. These quantized signature coefficients are then encoded using the multidimensional lattices and inserted into the host DCT coefficients. This insertion is adaptive to the local texture content of the host image blocks and controlled by the block texture factor as described in Section 5.2. The steps in embedding are summarized in Section 5.3.

5.1 Signature Image Quantization

There is clearly a trade-off between data embedding quantity and quality of reconstruction. We method discussed below provides a simple scheme here for quantizing signature image data using the block DCT quantization matrix. This approach enables robust recovery of signature data when the embedded image is subject to JPEG compression.

Figures 16, 17:
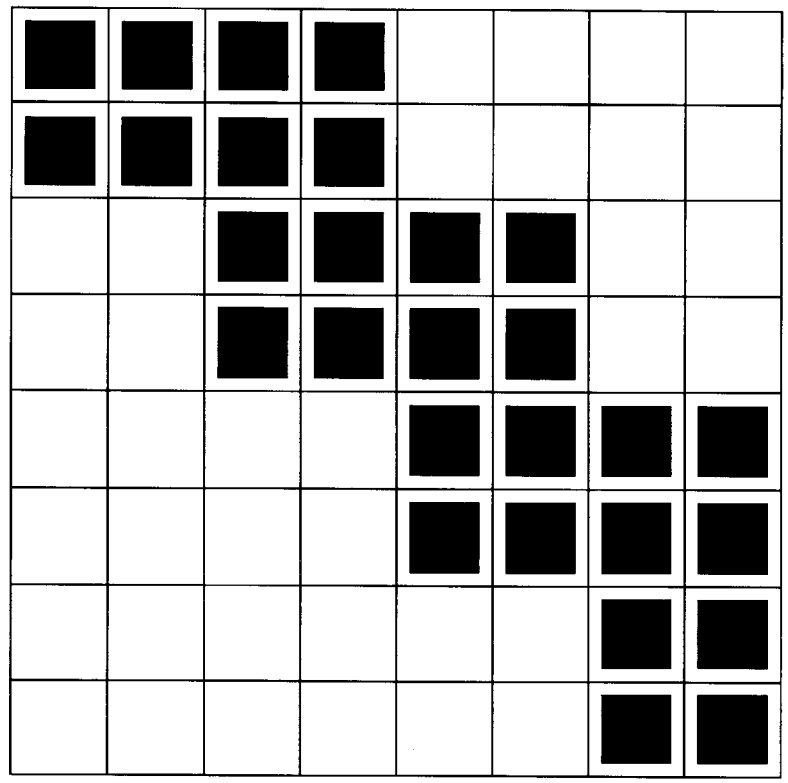
FIG. 16 is a diagram showing a sample signature quantization matrix for an 8×8 DCT coefficient block, requiring 112 host image coefficients to encode.
FIG. 17 is a diagram showing partitioning of the DCT block of FIG. 16 for signal insertion (shaded regions) where 18 coefficients are used in each block.

Consider an 8×8 DCT coefficient matrix. From image compression and information theory, it is well known that low frequency coefficients require more bits than the high frequency ones. One such quantization matrix indicating the number of quantization levels for each of the sixty-four coefficients is shown in FIG. 16. These quantized coefficients are embedded in a lattice structure as described in the previous section. For simplicity, we will consider only those shells in the lattice structure whose elements are $\{\pm1, 0\}$. One way of distributing these coefficients is as follows:

5.1.1 Quantization Level=1232. Use Lattice type $E_8$: The first and second shells of lattice combined have 2400 code words; however, here we use 1232 code words from the combination of first shell and part of second shell in this lattice. Since an $E_8$ code has eight components, it requires 8 host coefficients to embed one $E_8$ code. There are 3 coefficients with this quantization, requiring 24 host coefficients to embed.

5.1.2 Quantization Level=342. Use Lattice type $E_6$: The first and second shells of $E_6$ contain 342 code words. Six host coefficients are needed to embed an $E_6$ code. The six coefficients in the DCT matrix thus need 36 host image coefficients to embed.

5.1.3 Quantization Level=48. Use Lattice type $D_4$: The first two shells of $D_4$ are used to encode 48 levels. Each code requires four host coefficients. There are thirteen coefficients with this quantization, thus requiring 52 host coefficients.

Thus, method outlined above thus needs a total of 112 host coefficients to embed the 64 DCT coefficients from the signature image.

The next step in embedding is to identify the host coefficients which are affected by the data embedding procedure. The low frequency components contain most of the host signal energy but they can not be easily modified as such changes may become visible. The high frequency components, which usually pack the least amount of energy, could be easily removed because of signal processing operations. This leaves us with the mid frequency components.

Consider an 8×8 block of host image coefficients, as shown in FIG. 17. The shaded regions indicate the frequency components that are identified for encoding the signature image data. In this example, 28 host coefficients are used in each block, thus requiring four host DCT blocks to encode one signature block. It will be appreciated that four host DCT blocks (4×28=112) are needed to embed one 8×8 signature DCT block.

Figures 18, 19:
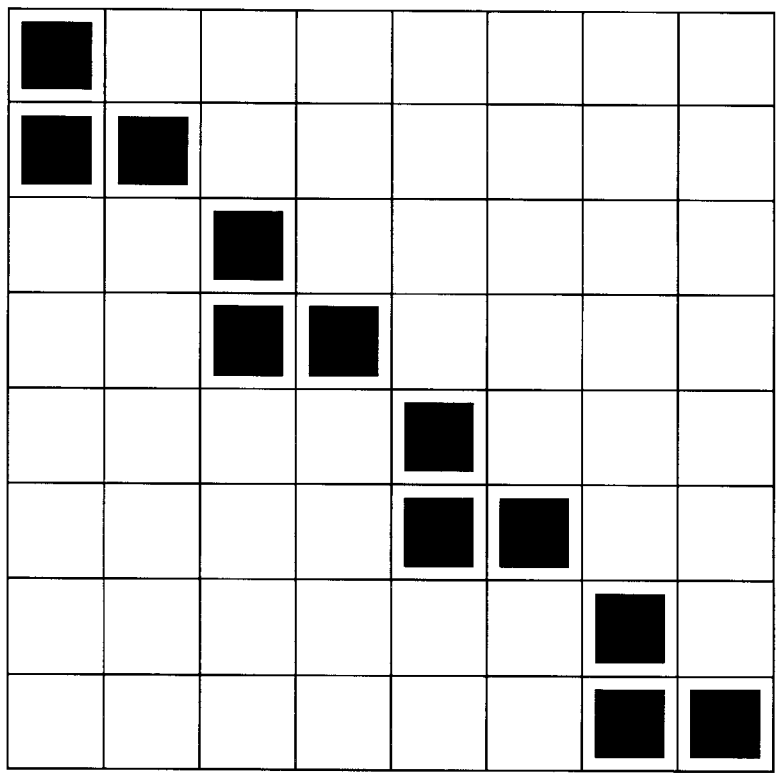
FIG. 18 is a diagram showing a sample signature quantization matrix requiring 192 host coefficients.
FIG. 19 is a diagram showing partitioning of the DCT block of FIG. 18 where the host coefficients are distributed over 16 blocks, 12 coefficients per block, as shown by the shaded regions.

Another example of signature image quantization and the corresponding host coefficient allocation are shown in FIG. 18 and FIG. 19. Note that 192 host coefficients are needed for this case (6× for $E_8$, 16× for $E_6$, and 12× for $D_4$ =6×8+16×6+12×4=192). One possible way of distributing this is shown in FIG. 19 where 12 host coefficients are identified for insertion. This requires a total of 16 host DCT blocks per signature block.

5.2 Texture Masking

The signature coefficients are adaptively embedded into the host image coefficients. Recall that insertions into host image regions with low texture information would result in visible distortions. The texture block factor γ controls the weighting of the signature coefficients for each 8×8 DCT host image block. We use a normalized measure of texture energy, defined as:

$$\mu_T(B) = \frac{\mu_D(B)}{\mu_W(B)} \quad (10)$$

where $\mu_W(B)$ is the average energy in band B (B={LH, HL, HH}) after a one level discrete wavelet decomposition of the host image $\mu_D(B)$ and is the average energy in band of a given 8×8 host image block. The term $\mu_T(B)$ characterizes the given block texture energy for a given band B. A Haar wavelet transform was used in our experiments. If $\mu_T(B)$ exceeds a given threshold, say $T_H(B)$, then the corresponding block is considered to have significant texture in band B. If the block texture energy exceeds the threshold for two out of three bands, then the block is considered to be highly textured. Similarly, if two out of three band energies fall below the threshold $T_L(B)$, then the corresponding block is considered to be low in texture.

Figure 20:
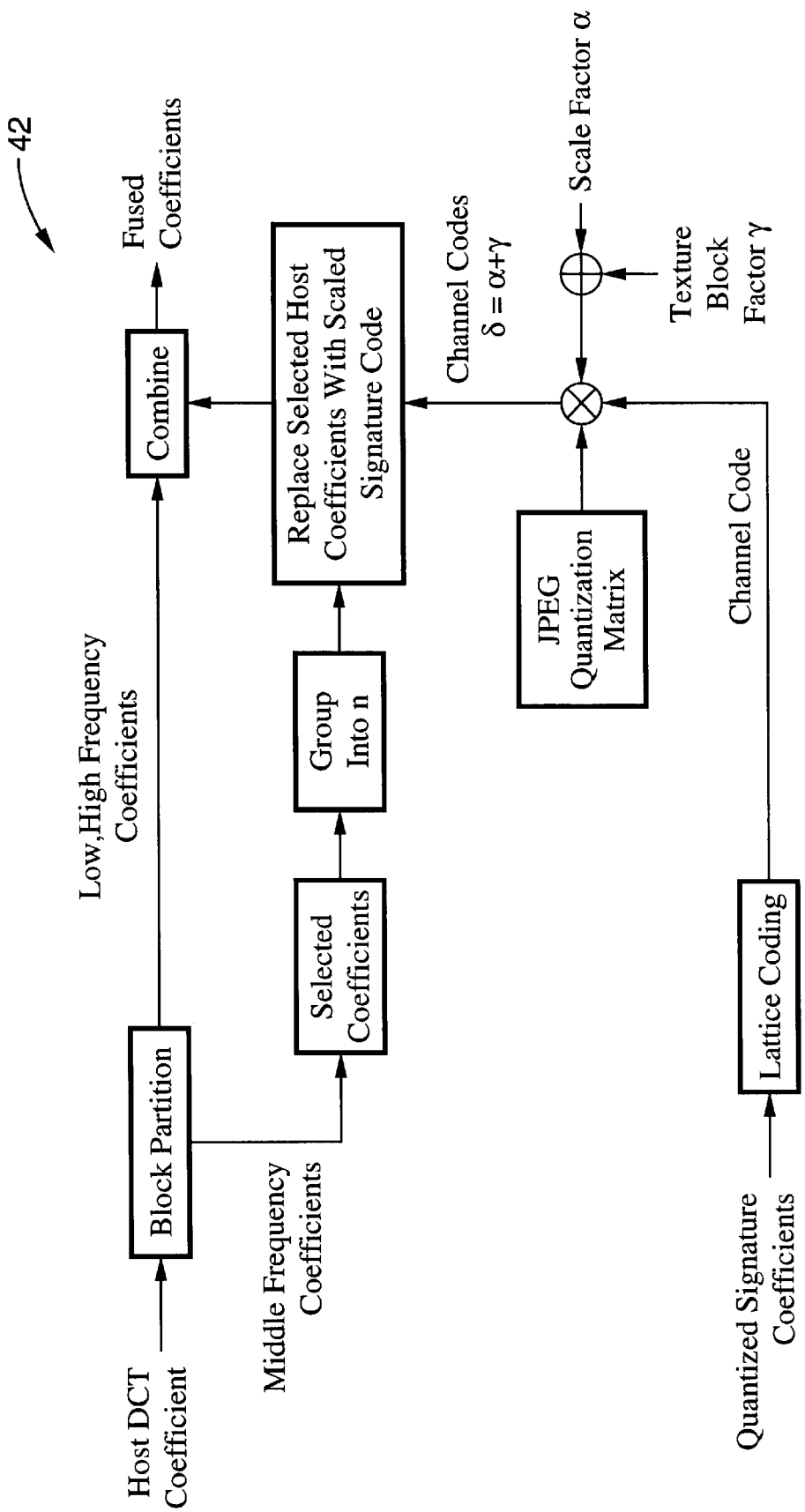
FIG. 20 is a block diagram of the encoder block shown in FIG. 15.

Each host image DCT block is thus classified into one of highly textured, normal, or low textured block, and the texture block factor is appropriately set. In the example discussed below the following parameter values are used:

$T_H(B)=4/3, \forall B; T_L(B)=\frac{3}{4}; \gamma(\text{high})=2; \gamma(\text{normal})=0; \gamma(\text{low})=-2$ 5.3 Data Embedding We can now summarize the various steps in the embedding procedure. FIG. 20 provides a schematic of the encoder block 42 of FIG. 15 to show the encoding steps.

5.3.1 The host and signature images are transformed to the DCT domain. A block size of 8×8 is used in the example given below.

5.3.2 Each block of 8×8 host image pixels is analyzed for its texture content and the corresponding texture block factor γ is computed.

5.3.3 The signature coefficients are quantized according to the signature quantization matrix and the resulting quantized coefficients are encoded using lattice codes. The lattice codes are so chosen that the code vectors contain only ±1 or zeros.

5.4 The signature codes are then appropriately scaled using the total scale factor $\delta=\alpha+\gamma$ and the commonly used JPEG quantization matrix. The JPEG quantization matrix helps in renormalizing the code vectors so that they have a similar dynamic range as a typical DCT block. Note that $\delta \geq 0$, which in turn constraints the choice of α and γ.

5.5 The selected host coefficients are then replaced by the scaled signature codes and combined with the original (unaltered) DCT coefficients to form a fused block of DCT coefficients. Note than more than one host coefficient is needed to encode a single signature code.

5.6 The fused coefficients are then inverse transformed to give an embedded image. As discussed earlier, the choice of signature quantization matrix affects the quantity and quality of the embedded data. Choice of the scale parameter α depends on the application. A larger value α for results in a more robust embedding at the cost of quality of the embedded image, i.e., there could be perceivable distortions in the embedded image. A smaller α may result in poor quality recovered signature when there is a significant compression of the embedded image.

EXAMPLE 4

We used two different sizes for the host image. For embedding using the signature quantization matrix of FIG. 16 and FIG. 17, a 256×256 host image was used, resulting in 25% data embedding. A 512×512 host image was used with the quantization matrix of FIG. 18 and FIG. 19.

We examined the embedded images with and without texture masking. The signature quantization matrix shown in FIG. 18 and FIG. 19 was used for this purpose. We found that texture masking reduces visible distortions in regions that are flat.

We also examined recovered host and signature images for two different quantizations of the signature data, using texture masking. In this case, the embedded images were lossy compressed by JPEG to 89%. Obviously, the quantization matrix of FIG. 18 and FIG. 19 yields better results than the one shown in FIG. 16 and FIG. 17 at the cost of more host bits per signature coefficient.

Figure 21:
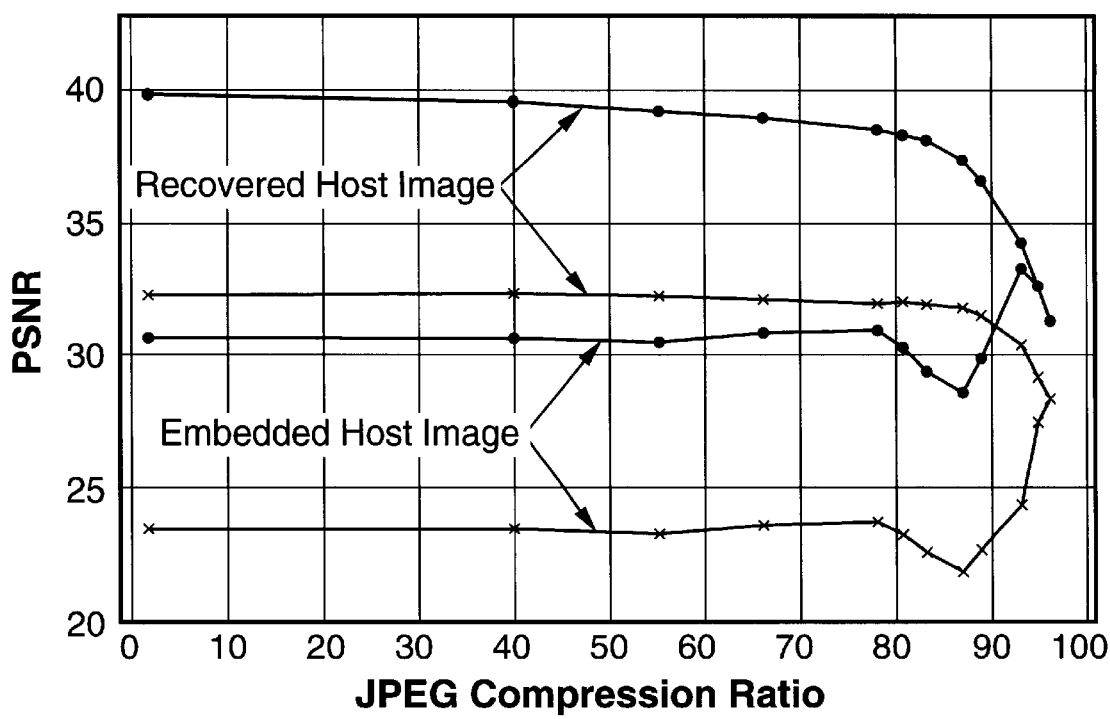
FIG. 21 is a graph showing the PSNR of embedded and recovered host images as a function of JPEG compression ratio with a scale factor of 5, wherein the solid lines represent 6% embedding using the quantization matrices of FIG. 18 and FIG. 19, and wherein the dashed lines shown the results at 25% embedding using the quantization matrices of FIG. 16 and FIG. 17.
Figure 22:
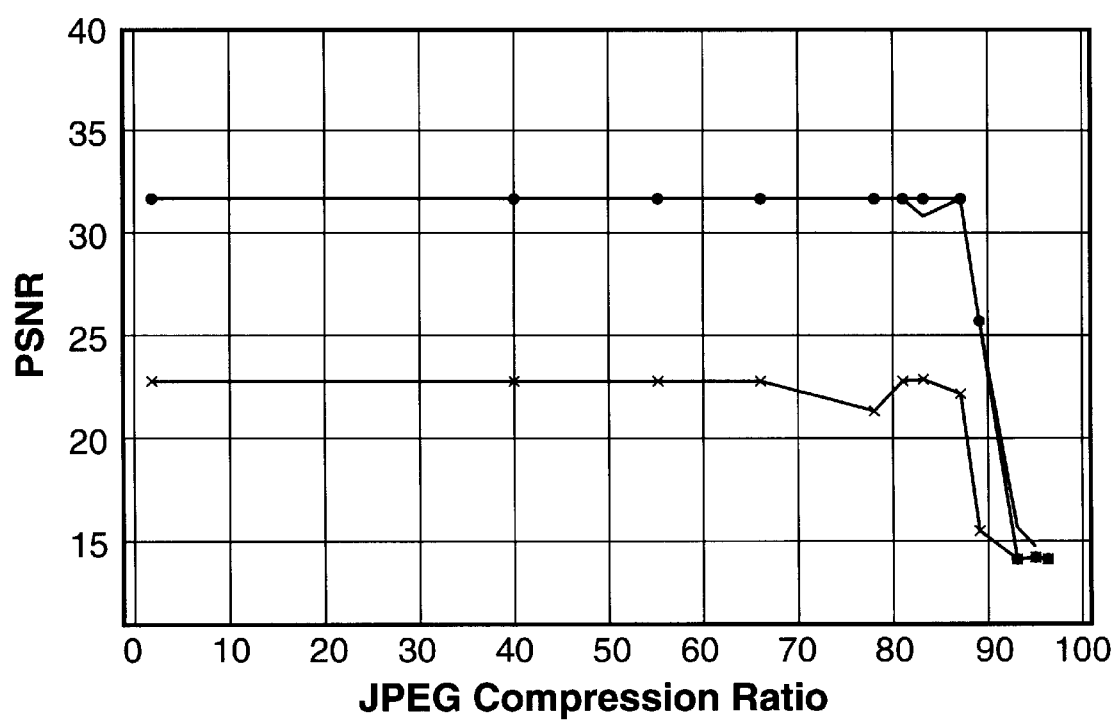
FIG. 22 is a graph showing the PSNR of the recovered signature image for the images of FIG. 21 as a function of JPEG compression ratio with a scale factor of 5, wherein the solid lines represent 6% embedding using the quantization matrices of FIG. 18 and FIG. 19, and wherein the dashed lines shown the results at 25% embedding using the quantization matrices of FIG. 16 and FIG. 17.

Finally, FIG. 21 and FIG. 22 show the quality of the embedded and recovered images using the PSNR as a measure. It is clear from these graphs that one can achieve better quality embedding using the quantization matrix of FIG. 18 and FIG. 19 at the cost of lower bit rate for the hidden data. We found that even at 25% embedding, one can recover visually acceptable quality results for up to 90% lossy compression using JPEG.

It will be seen, therefore, that the invention provides a robust data hiding technique for embedding images in images. A key component of the scheme is the use of multidimensional lattice codes for encoding signature image coefficients before inserting them into the host image DCT coefficients. Texture masking is used to reduce distortions in the embedded image by adaptively controlling the weights associated with the hidden data. The hidden signature data can be recovered in the absence of the original host image. Experimental results show that this method is robust to lossy image compression using JPEG. One can trade-off quantity for quality of the embedded image by choosing appropriate signature quantization matrices.

6. Hiding Speech in Video

In order to hide speech in video in accordance with the present invention, the host video is wavelet transformed frame by frame, and vectors of coefficients are perturbed using lattice channel codes to represent hidden vector quantized speech. The embedded video is subjected to H.263 compression before retrieving the hidden speech from it. The retrieved speech is intelligible even with large compression ratios of the host video.

Figure 23:
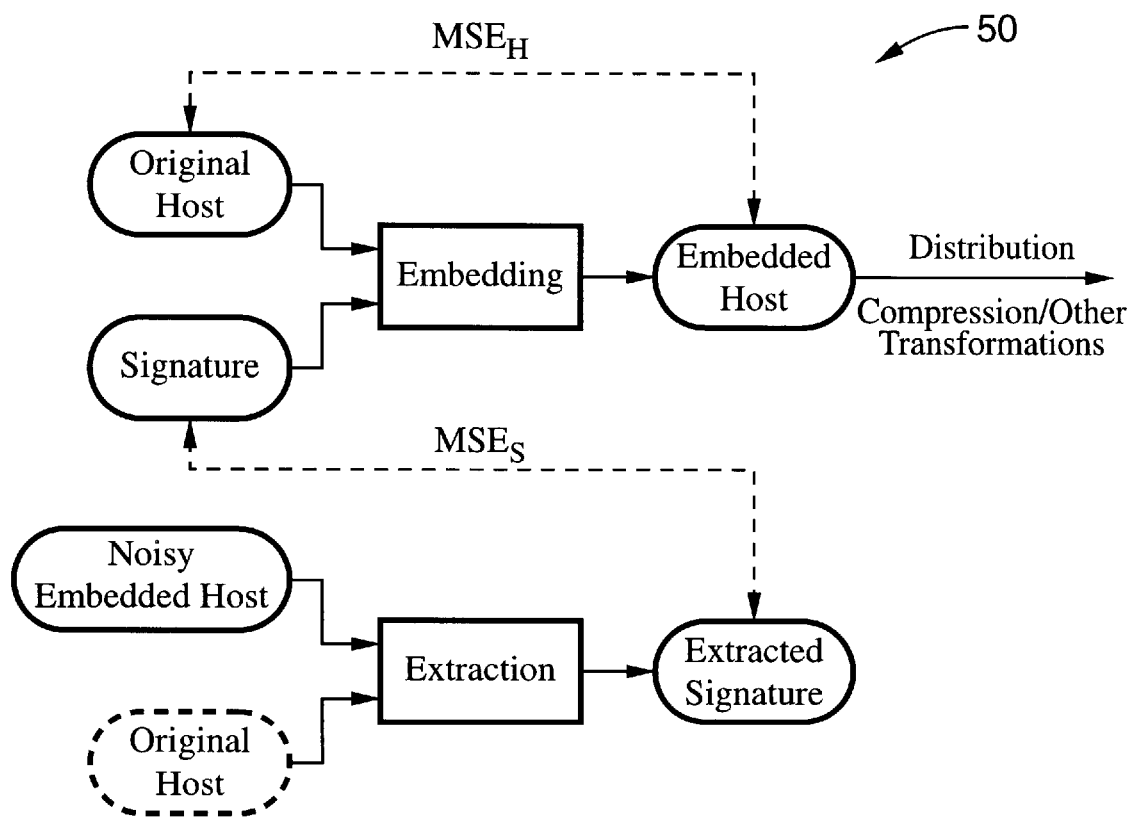
FIG. 23 is a schematic showing the data hiding and watermarking problem.

FIG. 23 presents a basic schematic 50 of the data hiding and watermarking problem as it applies to hiding speech in video. The original host is modified using the signature data in a deterministic fashion before distribution. As a result of embedding, a mean-squared-error $MSE_H$ is introduced into the embedded host. To ensure transparency of embedding, the $MSE_H$ value should be below a certain desired level. While in watermarking, the allowable $MSE_H$ is very small, and so is the amount of signature data. In data hiding, the focus is more on hiding larger amounts of signature data at the expense of a higher allowable $MSE_H$. On distribution, the host typically undergoes compression and other standard transformations. The extraction process may or may not, depending on the nature of the application, require knowledge of the original host, to estimate the hidden signature from the "noisy" embedded host that is received. After extraction, it is desired that the channel mean-squared-error $MSE_S$ between the original signature and the extracted signature be as low as possible.

From the discussion of data hiding techniques so far, it will be appreciated that the above dual problems of data hiding and watermarking, readily map to the source and channel coding problem in digital communications. As such, established concepts from digital communications could be used to solve this problem.

6.1 Data Hiding using Vector Perturbations

According to the present invention, the host data is orthogonally transformed before embedding the hidden signature in it. The transform is not essential because a raw image or video is by itself an expansion on the standard bases. However, it may lead to some advantages. Let us consider a host data source $(X_1, X_2, \ldots, X_N)$ transformed orthogonally to a set of N coefficients $(C_1, C_2, C_N)$. The transform-domain embedding process perturbs the coefficients into a new set of coefficients given by $(\hat{C}_1, \hat{C}_2, \ldots, \hat{C}_N)$. The inverse transformation then yields the embedded host $(\hat{X}_1, \hat{X}_2, \ldots \hat{X}_N)$. Since the transformation is orthogonal, the mean-squared-error introduced in the coefficients is exactly equal to the mean-squared-error introduced in the host data. That is, $$MSE_H = \frac{1}{N} \cdot \sum_{i=1}^{N} |X_i - \hat{X}_i|^2 = \frac{1}{N} \cdot \sum_{i=1}^{N} |C_i - \hat{C}_i|^2 \quad (11)$$

Now, a transparency constraint is imposed on the value of $MSE_H$. This specifies a maximum value P which upper bounds $MSE_H$ for a given application:

$$\frac{1}{N} \cdot \sum_{i=1}^{N} |X_i - \hat{X}_i|^2 < P \Rightarrow \frac{1}{N} \cdot \sum_{i=1}^{N} |C_i - \hat{C}_i|^2 < P \quad (12)$$

The smaller the value of P, the more transparent the embedding is, and vice-versa.

Since N is typically very large for images and video, it makes sense to simplify the transparency constraint by grouping the N coefficients into k-dimensional vectors with k<<N, and satisfying the constraint in each of the vectors individually. Further, it may be necessary to perturb only a limited number M of the N coefficients, say the coefficients in only one particular band of a subband or wavelet decomposition. That is, if the M coefficients to be perturbed are grouped into M/k vectors of dimension k, denoted as $V_j, j=1, 2, \ldots, M/k$, and the corresponding perturbed vectors are denoted as $\hat{V}_j$, then for each of the vectors, the following must be satisfied to satisfy the constraint in Equation (12):

$$1/k \cdot \|V_j - \hat{V}_j\|^2 < P_c = N/M \cdot P, j=1,2, \ldots, M/k \quad (13)$$

Figure 24:
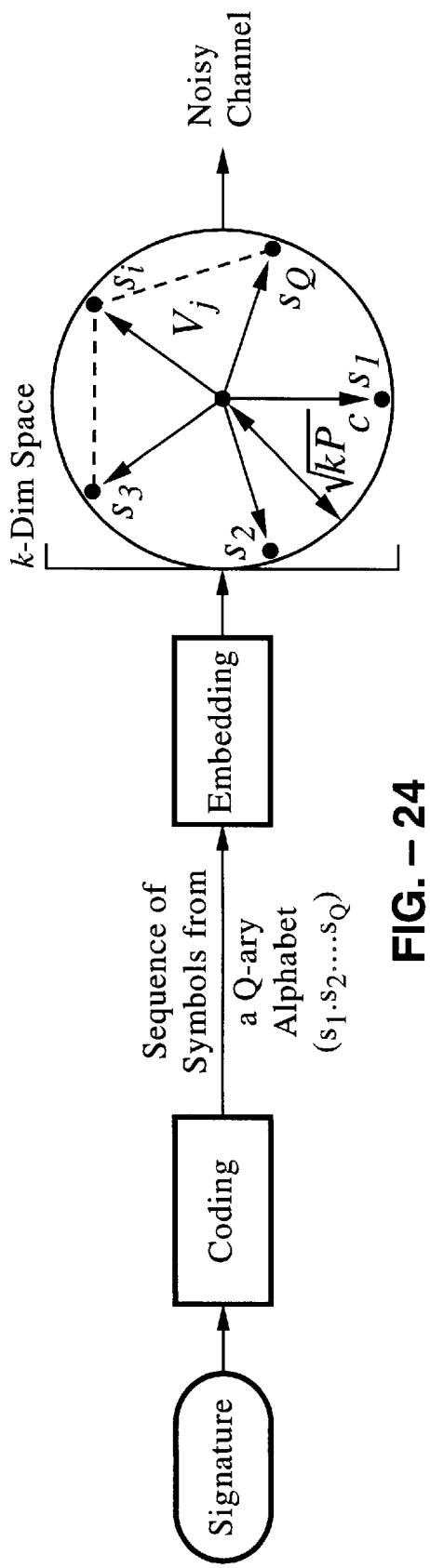
FIG. 24 is a diagram showing the principle of data embedding in relation to FIG. 23.

At this stage we can explain the general embedding principle by means of the diagram in FIG. 24. The signature data is first coded, either losslessly or lossily, to generate a sequence of symbols from a Q-ary alphabet $\{s_1, s_2, \ldots, s_Q\}$. The embedding process injects one symbol in each coefficient vector $V_j$, by perturbing it in one of Q possible ways in k-dimensional space to obtain the perturbed vector $\hat{V}_j$. Note that the possible values of $\hat{V}_j$ all lie within a shell of radius $\sqrt{kP_c}$ from $V_j$, to satisfy the transparency constraint. The possible perturbations constitute what is in general known as the channel codebook, of size Q and dimension k. The channel codebook is usually obtained from a noise-resilient channel code by scaling it by a factor $\alpha$ which determines the transparency constraint. That is, the perturbed vectors are obtained as:

$$\hat{V}_j = V_j + \alpha \cdot C(s_i), \quad (14)$$

where the set of vectors $C(s_i)$, i=1, 2, ..., Q constitute a channel shape codebook of size Q. The perturbed coefficients are used to inverse transform the host before transmission or distribution.

Figure 25:
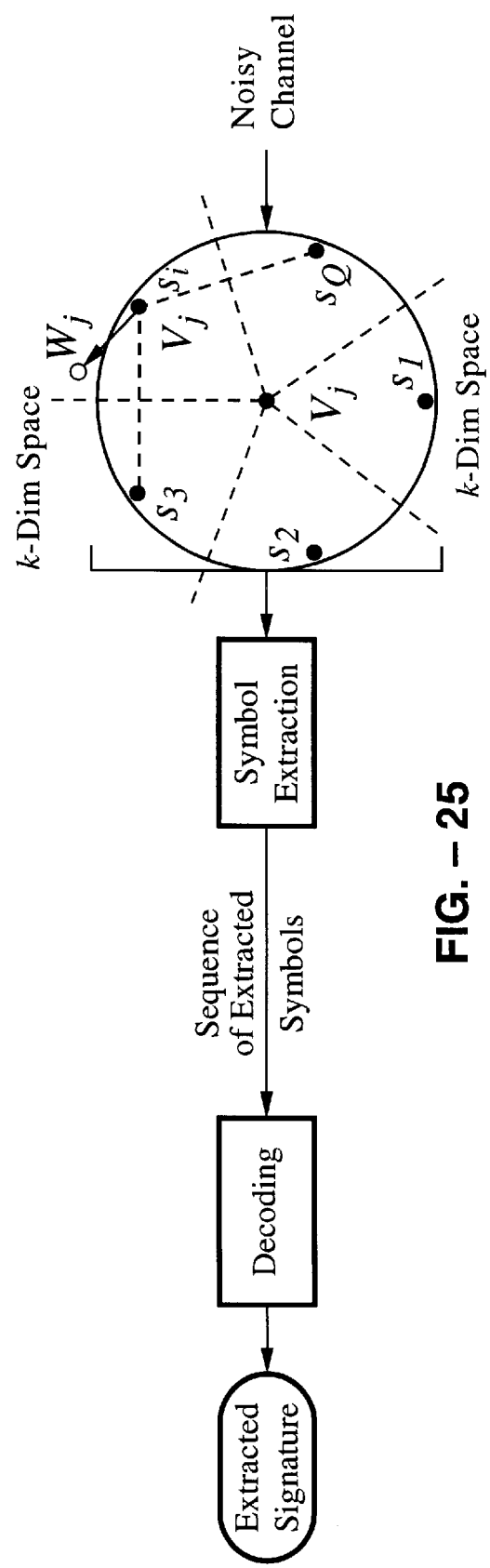
FIG. 25 is a diagram showing the principle of data extraction in relation to FIG. 24.

The extraction principle is outlined in FIG. 25. Let us say that the jth distributed perturbed vector $\hat{V}_j$, corresponding to a symbol $s_i$, has been received as $W_j$, as a result of an additive noise $n_j$ due to compression and other transformations. However, as long as the received vector does not go beyond certain pre-determined decision boundaries for symbol $s_i$, the correct transmitted symbol $s_i$ will still be extracted, provided the true original host is known. The recovery process thus extracts from each vector the symbol within whose decision boundaries the received vector lies. In other words, a nearest neighbor search with an appropriate distance measure is used. The decision boundaries depend on the statistical model chosen for the additive noise. The sequence of extracted symbols are then decoded to obtain the extracted signature.

Some comments are now in order. First, we can define a rate R for data injection in bits/dimension as follows:

$$R = 1/k \log_2 Q \quad (15)$$

Next, assuming an i.i.d. additive white Gaussian noise (AWGN) model for the pixels in the distributed host, and therefore its orthogonal transform coefficients, the extraction process becomes a simple nearest-neighbor encoder with the Euclidean distance measure and symmetric-hyperplane decision boundaries. Moreover, if we assume the AWGN variance to be $\sigma^2$, we can define a channel capacity, C as:

$$C = \frac{1}{2} \log_2 \left(1 + \frac{P_c}{\sigma^2}\right) \text{ bits.} \quad (16)$$

Thus, $P_c$, obtained by scaling the transparency constraint P by a factor (N/M), can be viewed as the power constraint on the channel. According to Shannon's celebrated theorem, as long as
R <C, virtually error-free transmission can be achieved by choosing a sufficiently large dimension k. The term C is the theoretical upper-bound on the error-free rate a AWGN channel can sustain for a given power constraint. Unfortunately, the upper-bound can only be achieved for infinite dimensionality k. In practice, the larger the dimension k, the more noise resilient the channel coder is. Therefore, the dimensionality of the vectors should be increased as much as possible.

Finally, with increase in the amount of signature data, it makes sense to lossily source code the data if it is compressible. A method that works well for correlated sources is vector quantization. The indices obtained by vector quantization are embedded into the host transform coefficients by vector perturbations derived from noise-resilient channel codes. Note that it is also possible to design channel-optimized VQs (COVQ), or Power-Constrained COVQs (PCCOVQ) for better noise performance.

In the present invention, the channel codes are chosen as subsets of lattices in multiple dimensions. It is known that the lattices $D_4$, $E_6$, $E_8$, $K_{12}$, $\Lambda_{16}$, etc. produce very good channel codes in their respective dimensions, and tables and graphs with their nominal coding gain results are commonly available.

Most of our implementations are based on spherical or constant-energy codes, for which, all the points are equidistant from the origin. With such codes, the $MSE_H$ introduced as a result of embedding is exactly equal to the transparency constraint. In practice however, for image and video hosts, the effect of rounding the pixels of the embedded host to integers, and limiting them to lie in the range of 0–255, may cause minor deviations from the theoretical value.

6.2 Recovery from Video Host without Original

The general principle of data hiding in video is as follows. Each frame of a video sequence is orthogonal wavelet transformed, and the transform coefficients are grouped into vectors. The signature data is vector quantized, and the indices are embedded into the coefficient vectors in one or more subbands using efficient channel codes. The same hidden data may be repeated in a few successive frames to introduce robustness to low frame rate compression of video. Note that the frame by frame approach fits very well with the frame-based compression technology currently in vogue.

We now focus on the issue of choice of subband for embedding the hidden data. When the original host is available during retrieval, and the kind of host transformation we are most concerned with is compression, hiding data in the lower subbands has several distinct advantages. Most modern compression schemes quantize the lower bands finely, and in some way exploit the fact that the higher bands have very little energy. Injecting extraneous information only in the lower bands, and leaving the higher bands untouched, therefore, reduces the probability of destruction of the hidden information, and at the same time does not affect any significant change in the coding efficiency. Although a disadvantage is that the distortions introduced by embedding may be perceptually more severe, weighing the pros and the cons, hiding data in the lower subbands is still found to be better.

Figure 26:
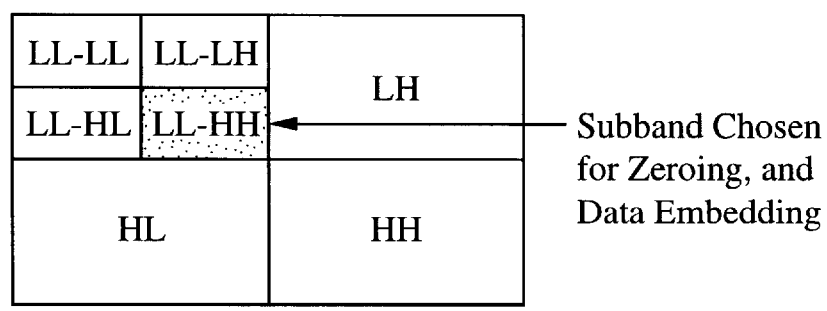
FIG. 26 is a diagram showing a two stage wavelet decomposition of each frame for recovery from a video host without the original video, where the data is hidden in the shaded LL-HH subband after zeroing.

If, however, extraction is to be made possible without knowledge of the original host, hiding data in the lower bands is not appropriate. The key idea behind a data hiding scheme that allows extraction without the original host, is to convert the original host conveniently before embedding to a slightly different one, and to use that as the base host for embedding, instead of the true original. The modification introduced must be such that it becomes possible to estimate the base perturbed vectors from the received host, with the modified base host being only trivially dissimilar to the true original. Natural images typically have very low energy in the high-high bands. Therefore, a simple zeroing out of one or more of the high-high bands, introduces a very low MSE, and for most images, affects image detail only inconspicuously in the perceptual sense. If a modified base host is obtained by zeroing out one or more of the subbands of the original host, the extraction process only needs to use the zero-vector as the estimation base for the perturbed vectors it receives within these subbands. This however, contradicts the requirements in the previous paragraph, that it is better to embed data in the lower subbands. To make a compromise, the following methodology is adopted. As shown in FIG. 26, a two-stage wavelet decomposition of each frame is made and the data is hidden in the shaded LL-HH subband after zeroing.

It is appropriate to make a comment on the zeroing out approach described above. Zeroing out one or more bands before embedding may result in significant distortions or loss of detail for some host videos. A greater transparency of embedding may be achieved if the coefficients in the concerned subbands in the base host are predicted, linearly or non-linearly, from the coefficients in the other subbands that are not zeroed out. Specifically, if the prediction used is linear, and the noise is assumed to be additive i.i.d. Gaussian, it can be shown that the noise in the predicted base coefficients will still be Gaussian. The estimation of the transmitted symbols will then be essentially the same problem as before, but at a higher noise level. In general however, linear prediction across subbands does not lead to any significant advantages. Obtaining the best nonlinear prediction across subbands, on the other hand, is a very difficult problem. Further, this leads to the difficult problem of estimation of the base coefficients in the embedded subbands, from the already noisy coefficients in the other subbands, at the retrieval end. In this case, the predicted base coefficients will no longer be Gaussian, and consequently, the decision boundaries for extraction may be very complex. In this work, we have sidetracked the issues involved by adopting a simple zeroing out approach, which works very well in practice.

Figure 27:
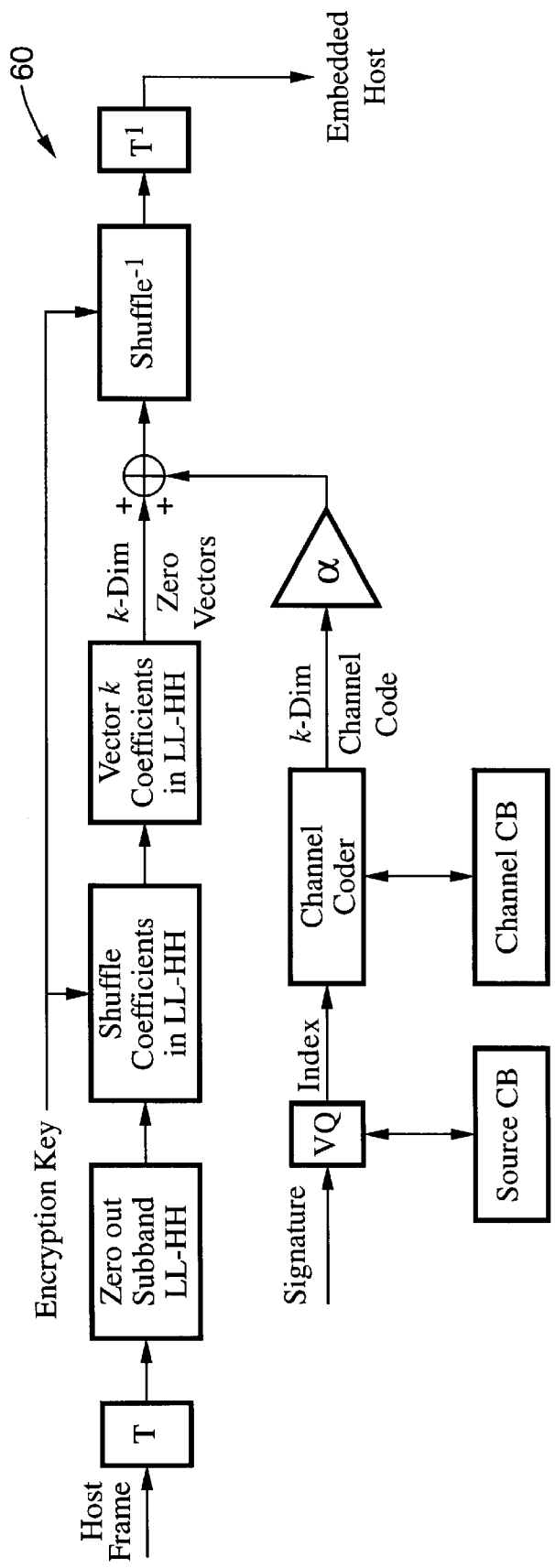
FIG. 27 is a schematic showing a method for data encoding in video according to the resent invention using the zeroed LL-HH subband.
Figure 28:
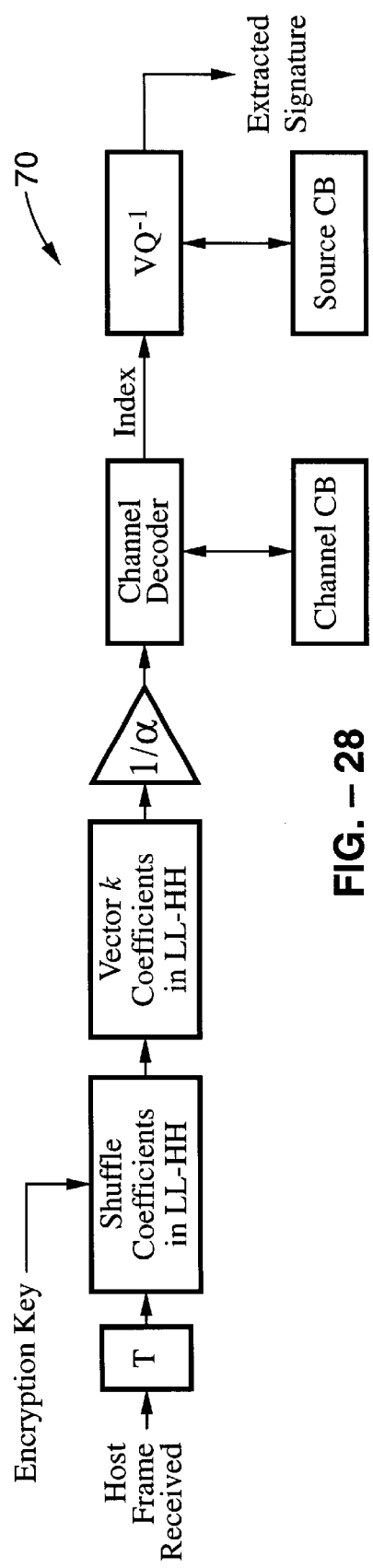
FIG. 28 is a schematic showing a method for data decoding in video according to the present invention using the zeroed LL-HH subband.
Figure 29:
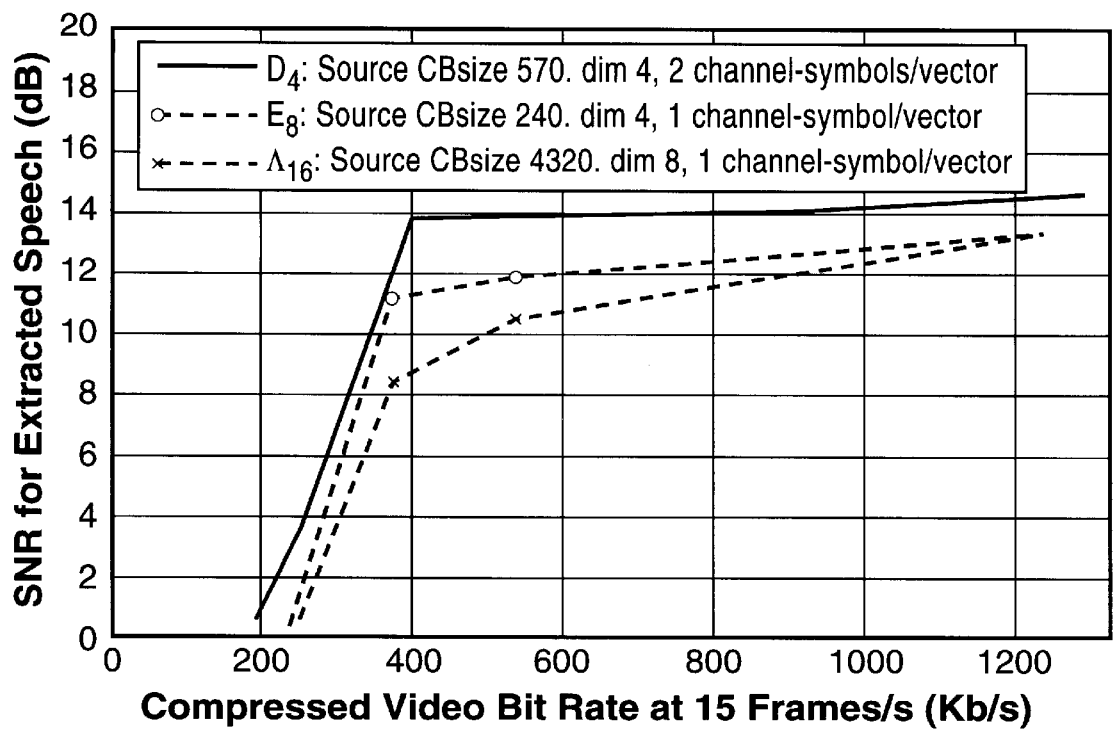
FIG. 29 is a graph showing the SNR of extracted hidden male speech vs. bit rate for an H.263 compressed "News" bit stream at 15 frames/s for $D_4$, $E_8$ and $\Lambda_{16}$ lattice implementations of the data hiding and recovery method depicted in FIG. 27 and FIG. 28.

FIG. 27 and FIG. 28 show schematic diagrams 60, 70 for the embedding and extraction mechanism outlined above, respectively. The host video is first wavelet transformed. An encryption key is used to pseudo-randomly shuffle the coefficients in the subband chosen for embedding before grouping them into k-dimensional vectors. The hidden compressible data is appropriately vector quantized, and the indices obtained in the process are embedded into the k-dimensional host transform vectors by vector perturbations in accordance with efficient channel codes scaled by a factor $\alpha$. The encryption key based shuffling introduces an additional layer of security apart from the security enforced by the already astronomic variability in the source and channel codebooks chosen. It is virtually impossible for unauthorized persons who know the algorithm, to pirate the hidden information, without knowledge of the source codebook, the channel codebook, or the encryption key.

Another advantage of using pseudo-random shuffling of coefficients to form vectors is as follows. Typically, the noise introduced as a result of transformations such as compression in a frame occur in "bursts". That is, a heavily corrupted coefficient is likely to have its neighboring coefficients also heavily corrupted. Therefore, if adjacent coefficients are grouped to form vectors, the noise in the components remain too correlated to fit our assumed model of being independent and identically distributed. Shuffling implies that the components of a vector now come from different random parts of a frame, and therefore, the noise introduced in the coefficients become closer to being i.i.d. This in turn validates the use of the Euclidean distance measure for channel decoding.

EXAMPLE 5

We implemented a system for hiding 8 kHz sampled speech at 16 bits/sample in a 30 frames/s QCIF video, without requiring the availability of the original video for retrieval. The speech and video were synchronized in time. Successive samples of speech were vector quantized, and the indices were embedded into the LL-HH subband coefficients of the video on a frame-by-frame basis. Temporal redundancy was incorporated by embedding the same information in several successive frames, so that the embedding becomes robust to frame skips during compression.

First, we attempted embedding the signature speech in only the luminance LL-HH subband. The embedded video was piped through a H.263 encoder as before, and the reconstructed video is used to extract the hidden speech segment. We present the details of three different implementations with increasing dimensionality of the channel codes used:

(a) The speech is vector quantized with a codebook of size 576 and dimension 4. The index obtained was decomposed into two 24-ary symbols, each of which was embedded into a vector of dimension 4 obtained by grouping four luminance LL-HH coefficients of a two-stage wavelet decomposition. The embedding was done by perturbing the vectors in accordance with a spherical channel code consisting of the first shell of the $D_4$ lattice (which has 24 points).

(b) The speech codebook is of size 240 and dimension 4. The index for each speech vector was used to perturb a group of 8 luminance LL-HH coefficients in accordance with a spherical channel code comprising the 240 points on the first shell of the $E_8$ lattice.

(c) The speech codebook is of size 4320 and dimension 8. The encoded index was embedded into a vector of size 16 obtained by grouping 16 luminance LL-HH coefficients. The channel code comprised the 4320 points on the first shell of the Barnes-Wall Lattice $\Lambda_{16}$.

For all the above implementations, the same information was repeated in two successive frames to introduce robustness to low frame rate compression. The News QCIF video was used as the host for hiding a segment of male speech. The signal to noise ratio for the extracted speech segment against the video bit rate after H.263 compression of the host at 15 frames/s (frameskip=1) is plotted in FIG. 29. The transparency constraint was the same for all these results. As expected, the highest dimensional lattice $\Lambda_{16}$ was found to be most robust to noise.

We next present the results for three implementations where both the luminance and the chrominance coefficients are perturbed:

(a) The speech codebook is of size 5184 and dimension 8. Each index was decomposed into two 72-ary symbols, which are embedded into two coefficient vectors of dimension 6. Each 6-dimensional coefficient vector was obtained by grouping 4 luminance LL-HH coefficients and 1 LL-HH coefficient from each chrominance component. A spherical channel code derived from the first shell of the $E_6$ lattice (which also has 72 points) was used for each symbol.

(b) The speech is vector quantized with a codebook of size 756 and dimension 8. A 12-dimensional coefficient vector was obtained by grouping 8 luminance LL-HH coefficients and 2 LL-HH coefficients from each chrominance component. A spherical channel code consisting of the 756 points on the first shell of the Coxeter-Todd lattice $K_{12}$ was used.

(c) The speech is vector quantized with a codebook of size 4096 and dimension 16. A 24-dimensional coefficient vector was obtained by grouping 16 luminance LL-HH coefficients and 4 LL-HH coefficients from each chrominance component. A spherical channel code $G_{24}$, consisting of 4096 points, was used. $G_{24}$ was obtained from the (24, 12) extended Golay code by converting zeroes to ones, and ones to negative ones.

Figure 30:
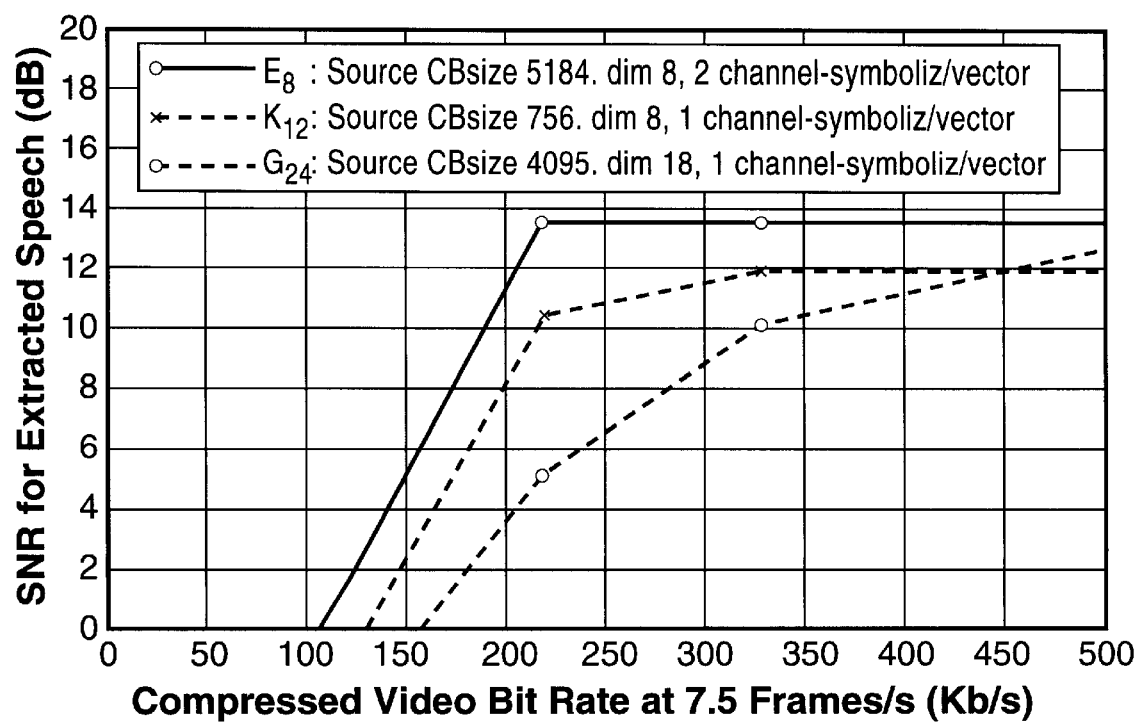
FIG. 30 is a graph showing the SNR of extracted hidden female speech vs. bit rate for an H.263 compressed "grandmother" bit stream at 7.5 frames/s for $E_6$, $K_{12}$ and $G_{24}$ lattice implementations of the data hiding and recovery method depicted in FIG. 27 and FIG. 28.

For all the above implementations, the same information was repeated in four successive frames. FIG. 30 presents the retrieval SNR vs. bit rate results for the above methods when a segment of female speech was hidden in a Grandmother QCIF video, which was then coded by H.263 at 7.5 frames/s (frameskip=3). The transparency constraint was the same for all these results. As expected, the highest dimensional lattice $G_{24}$ was found to be most robust to noise.

As can be seen therefore, the foregoing provides a generic framework for hiding compressible data in host video. Our MSE-optimal quantitative treatment is motivated by the identification of the similarity of the data hiding problem with the source and channel coding problem in digital communications. While the generic approach can be used successfully for the case when the original host is available to the retriever, the true potential of data hiding lies in being able to extract the hidden data without using the original host. The above method is readily adapted to allow this, making possible invisible mixing of different kinds of hidden data, with standard forms of open data transmission.

Although the description above contains many specificities, these should not be construed as limiting the scope of the invention but as merely providing illustrations of some of the presently preferred embodiments of this invention. Thus the scope of this invention should be determined by the appended claims and their legal equivalents.

TABLE 1

Code Types and structure of the D4 lattices

| Shell No. | Squared Norm | Source codes | Number of codes |
|---|---|---|---|
| 1 | 2 | $(\pm 1, \pm 1, 0, 0)^P$ | 24 |
| 2 | 4 | $(\pm 2, 0, 0, 0)^P$, $(\pm 1, \pm 1, \pm 1, \pm 1)^P$ | 24 |
| 3 | 6 | $(\pm 2, \pm 1, \pm 1, 0)^P$ | 96 |
| 4 | 8 | $(\pm 2, \pm 2, 0, 0)^P$ | 24 |
| 5 | 10 | $(\pm 2, \pm 2, \pm 1, \pm 1)^P$, $(\pm 3, \pm 1, 0, 0)^P$ | 144 |

TABLE 2

Quantizer Level ($D_4$ lattice)

| Quantizer Levels β | Lattice points in channel code |
|---|---|
| 2 | (0, 0, 1, 1), (0, 0, −1, −1) |
| 24 | Shell$_1$ |
| 32 | Shell$_1$, $(\pm 2, 0, 0, 0)^P$ |
| 48 | Shell$_1$, Shell$_2$ |
| 144 | Shell$_1$, Shell$_2$ Shell$_3$ |
| 168 | Shell$_1$, Shell$_2$ Shell$_3$, Shell$_4$ |

What is claimed is:

1. A method for embedding a signature image in a host image, comprising:

(a) performing a single level discrete wavelet transform decomposition of said signature image and said host image;

(b) quantizing into β levels each coefficient of said signature image by grouping a set of n coefficients in the host image to form an n-dimensional vector, and perturbing said vector according to a β-ary channel code comprising a subset of an n-dimensional lattice scaled by a factor α;

(c) embedding each subband of said signature image into a corresponding subband of said host image to produce a composite image;

(d) subtracting the coefficients of said host image from the coefficients of the composite image to obtain noisy perturbations;

(e) grouping the resulting coefficients into groups of n to obtain a vector $\vec{e}$;

(f) scaling said vector $\vec{e}$ by 1/α to produce a resulting vector $1/\alpha \cdot \vec{e}$;

(g) nearest-neighbor encoding $1/\alpha \cdot \vec{e}$ to find an index i of the channel code nearest to it in Euclidean distance;

(h) obtaining a quantized discrete wavelet transform coefficients from said index i.

2. A method for embedding an audio signature in a host video image, comprising:

(a) encoding said audio signature to generate a sequence of symbols from a Q-ary alphabet $\{s_1, s_2, \ldots, s_Q\}$;

(b) injecting one symbol in each coefficient vector $V_j$, by perturbing it in at least one of Q possible ways in k-dimensional space to obtain the perturbed vector $V_j$; and (c) using perturbed coefficients to inverse transform said host video image and produce a composite signal.

3. A method as recited in claim 2, further comprising extracting from each perturbed vector the symbol within whose decision boundaries the vector of the composite signal lies.

* * * * *